United States Patent
Ghosh et al.

(10) Patent No.: US 11,830,267 B2
(45) Date of Patent: Nov. 28, 2023

(54) TECHNIQUES FOR DIGITAL DOCUMENT ANALYSIS USING DOCUMENT IMAGE FINGERPRINTING

(71) Applicant: Optum, Inc., Minnetonka, MN (US)

(72) Inventors: Nilav Baran Ghosh, Pune (IN); Indranil Basu, Kolkata (IN); Piyal De, Kolkata (IN)

(73) Assignee: Optum, Inc., Minnetonka, MN (US)

( * ) Notice: Subject to any disclaimer, the term of this patent is extended or adjusted under 35 U.S.C. 154(b) by 182 days.

(21) Appl. No.: 17/459,642

(22) Filed: Aug. 27, 2021

(65) Prior Publication Data
US 2023/0066906 A1    Mar. 2, 2023

(51) Int. Cl.
*G06V 30/412* (2022.01)
*G06V 30/418* (2022.01)

(52) U.S. Cl.
CPC .......... *G06V 30/412* (2022.01); *G06V 30/418* (2022.01)

(58) Field of Classification Search
None
See application file for complete search history.

(56) References Cited

U.S. PATENT DOCUMENTS

| | | | |
|---|---|---|---|
| 6,562,077 B2 | 5/2003 | Bobrow et al. | |
| 7,561,734 B1 | 7/2009 | Wnek | |
| 8,595,235 B1 | 11/2013 | Sampson et al. | |
| 8,832,108 B1 | 9/2014 | Sampson | |
| 9,836,455 B2 | 12/2017 | Martens et al. | |
| 10,318,556 B2 | 6/2019 | Summerlin et al. | |
| 10,949,661 B2 | 3/2021 | Bhotika et al. | |
| 10,956,511 B2 | 3/2021 | Kumar | |
| 2009/0116755 A1 | 5/2009 | Neogi et al. | |
| 2009/0324100 A1* | 12/2009 | Kletter | G06V 30/18152 382/217 |
| 2013/0061132 A1* | 3/2013 | Zheng | G06V 30/412 715/234 |
| 2014/0085323 A1 | 3/2014 | Wang et al. | |
| 2014/0337719 A1* | 11/2014 | Xu | G06F 3/0484 715/255 |
| 2015/0199598 A1 | 7/2015 | Iams | |
| 2019/0121840 A1 | 4/2019 | Abbott et al. | |
| 2020/0273078 A1* | 8/2020 | Xu | G06Q 30/04 |
| 2021/0049401 A1 | 2/2021 | Jean et al. | |
| 2021/0192201 A1* | 6/2021 | Nguyen | G06V 20/62 |

(Continued)

OTHER PUBLICATIONS

Hsu PF, Wei C. Neural Graph Matching for Modification Similarity Applied to Electronic Document Comparison. arXiv preprint arXiv:2204.05486. Apr. 12, 2022. (Year: 2022).*

(Continued)

*Primary Examiner* — Michelle M Entezari

(74) *Attorney, Agent, or Firm* — ALSTON & BIRD LLP

(57) ABSTRACT

Various embodiments of the present invention provide methods, apparatus, systems, computing devices, computing entities, and/or the like for performing predictive structural analysis. Certain embodiments of the present invention utilize systems, methods, and computer program products that perform digital document analysis using at least one of spatial fingerprint document image pair distance measures for document image pairs, object fingerprint document image pair distance measures for document image pairs, and semantic fingerprint document image pair distance measures for document image pairs.

20 Claims, 13 Drawing Sheets

(56) References Cited

U.S. PATENT DOCUMENTS

| | | | |
|---|---|---|---|
| 2021/0295822 A1* | 9/2021 | Tomkins | G06F 16/90332 |
| 2022/0058429 A1* | 2/2022 | Zou | G06V 10/82 |
| 2022/0129688 A1* | 4/2022 | Yu | G06V 10/22 |
| 2023/0118864 A1* | 4/2023 | Zhang | G06V 20/80 |
| | | | 382/103 |

OTHER PUBLICATIONS

Bansal A, Roy SD, Harit G. Extraction of Layout Entities and Sub-layout Query-based Retrieval of Document Images. arXiv preprint arXiv:1609.02687. Sep. 9, 2016. (Year: 2016).*

Wang R, Fujii Y, Popat AC. Post-ocr paragraph recognition by graph convolutional networks. InProceedings of the IEEE/CVF Winter Conference on Applications of Computer Vision 2022 (pp. 493-502). (Year: 2022).*

Lee CY, Li CL, Wang C, Wang R, Fujii Y, Qin S, Popat A, Pfister T. Rope: reading order equivariant positional encoding for graph-based document information extraction. arXiv preprint arXiv:2106.10786. Jun. 21, 2021. (Year: 2021).*

Zhang C, Lin Y, Zhu L, Yuan X, Long J, Huang F. Hierarchical one permutation hashing: efficient multimedia near duplicate detection. Multimedia Tools and Applications. Nov. 2019;78:30537-60. (Year: 2019).*

Patil AG, Li M, Fisher M, Savva M, Zhang H. Layoutgmn: Neural graph matching for structural layout similarity. InProceedings of the IEEE/CVF Conference on Computer Vision and Pattern Recognition 2021 (pp. 11048-11057). (Year: 2021).*

Aggarwal CC, Wang H, editors. Managing and mining graph data. New York: Springer; Feb. 2, 2010. (Year: 2010).*

Sun H, Kuang Z, Yue X, Lin C, Zhang W. Spatial dual-modality graph reasoning for key information extraction. arXiv preprint arXiv: 2103.14470. Mar. 26, 2021. (Year: 2021).*

Frisoni G, Moro G, Carlassare G, Carbonaro A. Unsupervised event graph representation and similarity learning on biomedical literature. Sensors. Dec. 21, 2021;22(1):3. (Year: 2021).*

Bickle A. Fundamentals of graph theory. American Mathematical Soc.; Mar. 10, 2020. (Year: 2020).*

"OpenText Captiva—Redefine Your Business Through Intelligent Enterprise Capture," OpenText, May 2017, (20 pages), [Retrieved from the Internet Nov. 23, 2021] <URL: https://documentum.opentext.com/wp-content/uploads/2017/05/Captiva-eBook-Rev1.pdf>.

Blumenthal, David B. "New Techniques For Graph Edit Distance Computation," arXiv: 1908.00265 [cs.DS], Aug. 1, 2019, (234 pages), available online at https://arxiv.org/ftp/arxiv/papers/1908/1908.00265.pdf.

Fong, A.C.M. "Journal of Advances In Information Technology," vol. 1, No. 1, Feb. 2010, (67 pages), ISSN: 1798-2340.

Kowsari, Kamran et al. "Text Classification Algorithms: A Survey," Information, vol. 10, No. 4:150, Apr. 2019, pp. 1-68, DOI: 10.3390/info10040150.

* cited by examiner

FIG. 7

Determine a dimension-wise mean coordinate for each document image bounding box with respect to a first image document dimension
801

Determine a dimension-wise bounding box pair distance measure for each bounding box pair
802

Generate a dimension-wise bounding box distance measure graph data object based on each dimension-wise bounding box pair distance measure
803

FIG. 8

TECHNIQUES FOR DIGITAL DOCUMENT ANALYSIS USING DOCUMENT IMAGE FINGERPRINTING

BACKGROUND

Various embodiments of the present invention address technical challenges related to performing predictive structural analysis and provide solutions to address the efficiency and reliability shortcomings of existing digital document analysis.

BRIEF SUMMARY

In general, various embodiments of the present invention provide methods, apparatus, systems, computing devices, computing entities, and/or the like for performing predictive structural analysis. Certain embodiments of the present invention utilize systems, methods, and computer program products that perform digital document analysis using at least one of spatial fingerprint document image pair distance measures for document image pairs, object fingerprint document image pair distance measures for document image pairs, and semantic fingerprint document image pair distance measures for document image pairs.

In accordance with one aspect, a method is provided. In one embodiment, the method comprises: for each table column: identifying one or more document image bounding boxes for each document image data object in a document image pair; identify a plurality of document image dimensions associated with the first document image data object and the second document image data object; for each document image dimension: (i) determining a dimension-wise bounding box pair distance measure graph data object for each document image data object in the document pair, wherein the dimension-wise bounding box pair distance measure graph data object for a document image data object describes, for each bounding box pair selected from the one or more document image bounding boxes of the document image data object, a dimension-wise bounding box pair distance measure for the bounding box pair with respect to the document image dimension, and (ii) determining a cross-graph document image pair distance measure between each dimension-wise bounding box pair distance measure graph data object for the document image dimension; determining a spatial fingerprint document image pair distance measure for the document image pair based at least in part on each cross-graph document image pair distance measure for a document image dimension; determining a predicted document image pair distance measure based at least in part on the spatial fingerprint document image pair distance measure; and performing one or more prediction-based actions based at least in part on the predicted document image pair distance measure.

In accordance with another aspect, a computer program product is provided. The computer program product may comprise at least one computer-readable storage medium having computer-readable program code portions stored therein, the computer-readable program code portions comprising executable portions configured to: identify one or more document image bounding boxes for each document image data object in a document image pair; identify a plurality of document image dimensions associated with the first document image data object and the second document image data object; for each document image dimension: (i) determine a dimension-wise bounding box pair distance measure graph data object for each document image data object in the document pair, wherein the dimension-wise bounding box pair distance measure graph data object for a document image data object describes, for each bounding box pair selected from the one or more document image bounding boxes of the document image data object, a dimension-wise bounding box pair distance measure for the bounding box pair with respect to the document image dimension, and (ii) determine a cross-graph document image pair distance measure between each dimension-wise bounding box pair distance measure graph data object for the document image dimension; determine a spatial fingerprint document image pair distance measure for the document image pair based at least in part on each cross-graph document image pair distance measure for a document image dimension; determine a predicted document image pair distance measure based at least in part on the spatial fingerprint document image pair distance measure; and perform one or more prediction-based actions based at least in part on the predicted document image pair distance measure.

In accordance with yet another aspect, an apparatus comprising at least one processor and at least one memory including computer program code is provided. In one embodiment, the at least one memory and the computer program code may be configured to, with the processor, cause the apparatus to: identify one or more document image bounding boxes for each document image data object in a document image pair; identify a plurality of document image dimensions associated with the first document image data object and the second document image data object; for each document image dimension: (i) determine a dimension-wise bounding box pair distance measure graph data object for each document image data object in the document pair, wherein the dimension-wise bounding box pair distance measure graph data object for a document image data object describes, for each bounding box pair selected from the one or more document image bounding boxes of the document image data object, a dimension-wise bounding box pair distance measure for the bounding box pair with respect to the document image dimension, and (ii) determine a cross-graph document image pair distance measure between each dimension-wise bounding box pair distance measure graph data object for the document image dimension; determine a spatial fingerprint document image pair distance measure for the document image pair based at least in part on each cross-graph document image pair distance measure for a document image dimension; determine a predicted document image pair distance measure based at least in part on the spatial fingerprint document image pair distance measure; and perform one or more prediction-based actions based at least in part on the predicted document image pair distance measure.

In accordance with some embodiments of each of the above-noted three aspects, determining the predicted document image pair distance measure further comprises: for each document image data object in the document image pair: (i) determining one or more image crops corresponding to the one or more document image bounding boxes of the document image data object; (ii) generating one or more image crop embeddings based at least in part on the one or more image crops; and (iii) generating an object fingerprint document image representation for the document image data object based at least in part on the one or more image crop embeddings; determining an object fingerprint document image pair distance measure for the document image pair based at least in part on each object fingerprint document image representation for a document image data object; and determining the predicted document image pair distance measure based at least in part on the object fingerprint document image pair distance measure.

In accordance with some embodiments of each of the above-noted three aspects, determining the predicted document image pair distance measure further comprises: for each document image data object in the document image pair: (i) identifying a textual representation of the document image data object; and (ii) generating a semantic fingerprint document image representation of the document image data object based at least in part on the textual representation; determining a semantic fingerprint document image pair distance measure for the document image pair based at least in part on each semantic fingerprint document image representation for a document image data object; and determining the predicted document image pair distance measure based at least in part on the semantic fingerprint document image pair distance measure.

BRIEF DESCRIPTION OF THE DRAWINGS

Figure 1:
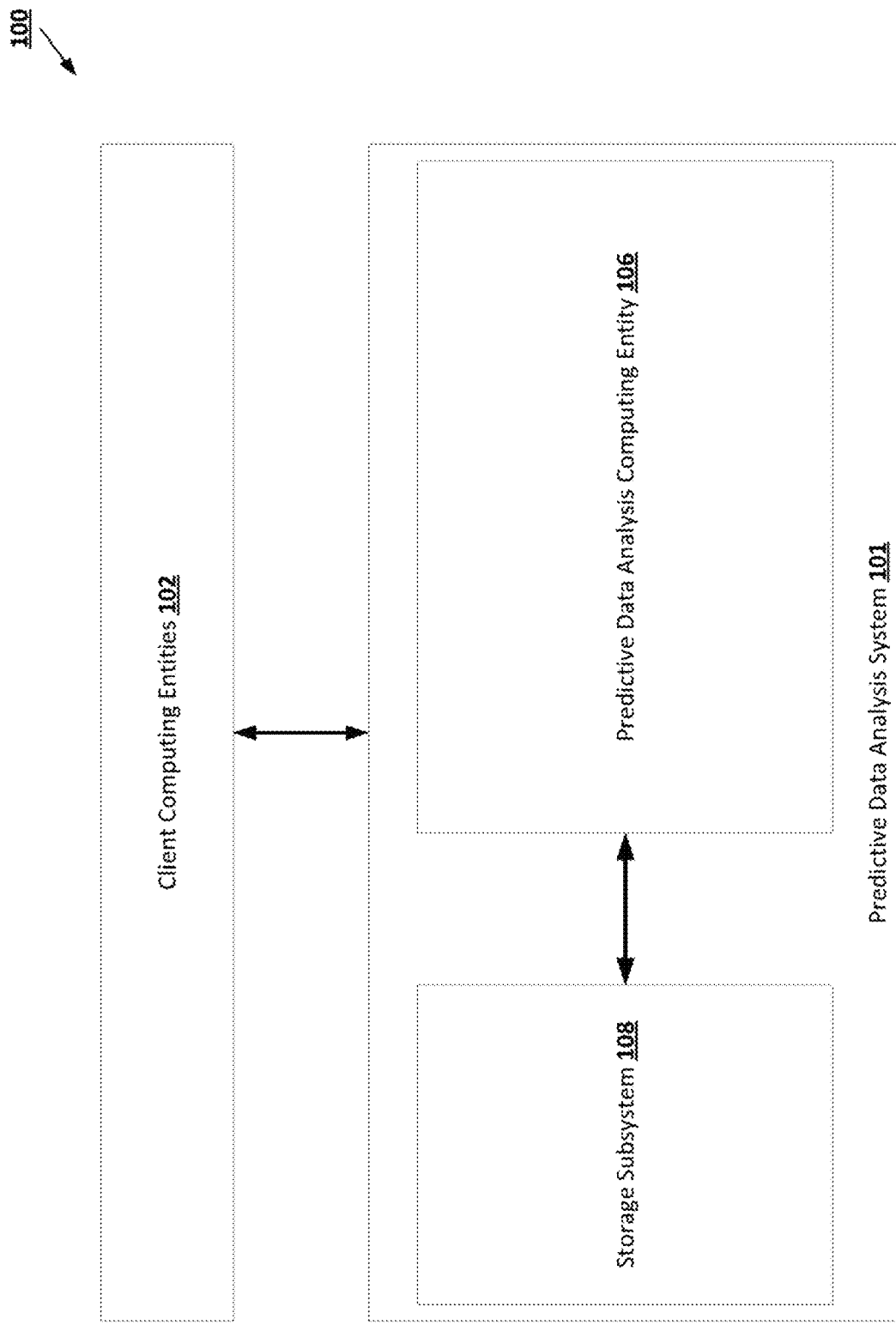

Having thus described the invention in general terms, reference will now be made to the accompanying drawings, which are not necessarily drawn to scale, and wherein:

FIG. 1 provides an exemplary overview of an architecture that can be used to practice embodiments of the present invention.

Figure 2:
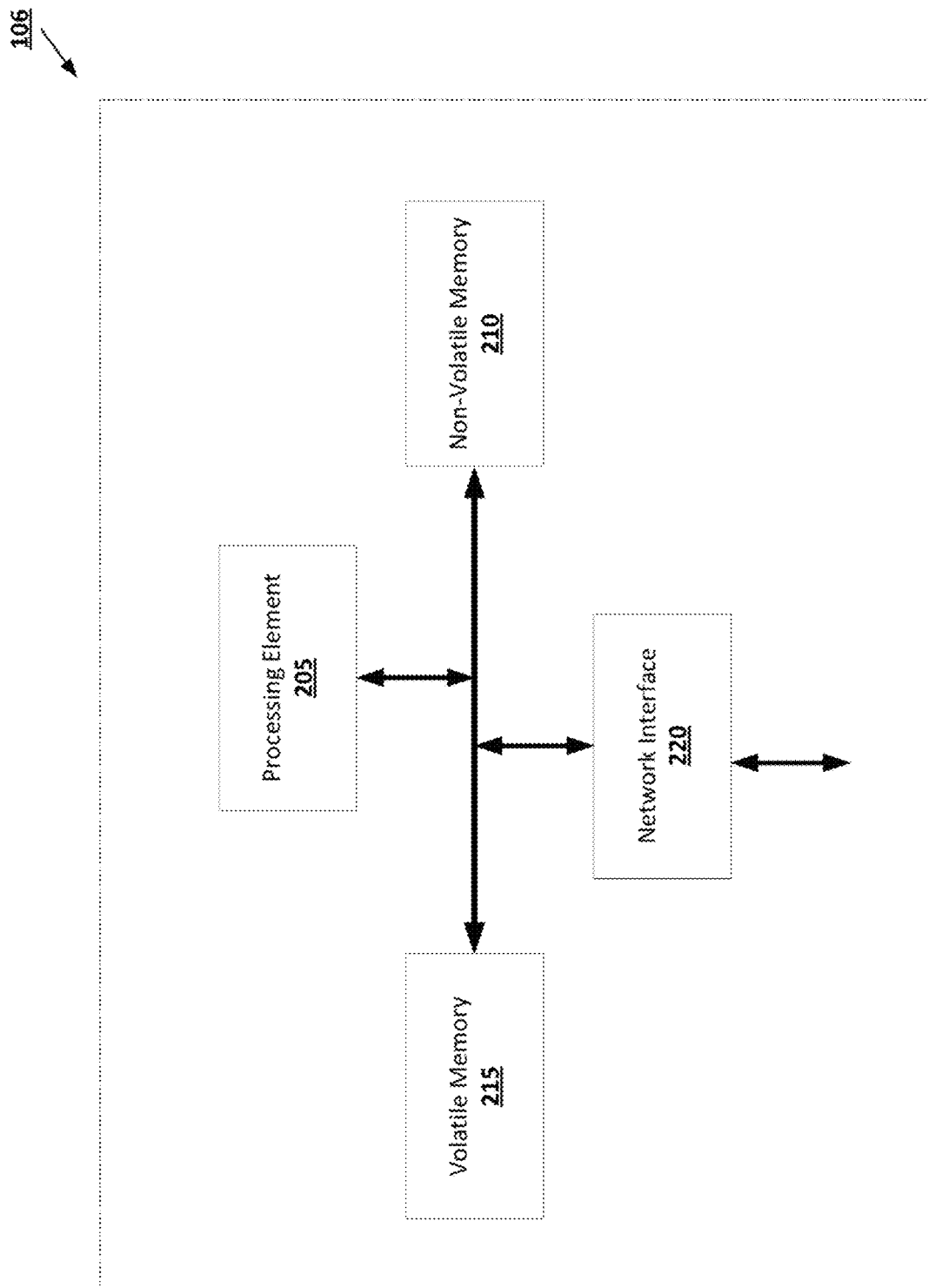

FIG. 2 provides an example predictive data analysis computing entity in accordance with some embodiments discussed herein.

Figure 3:
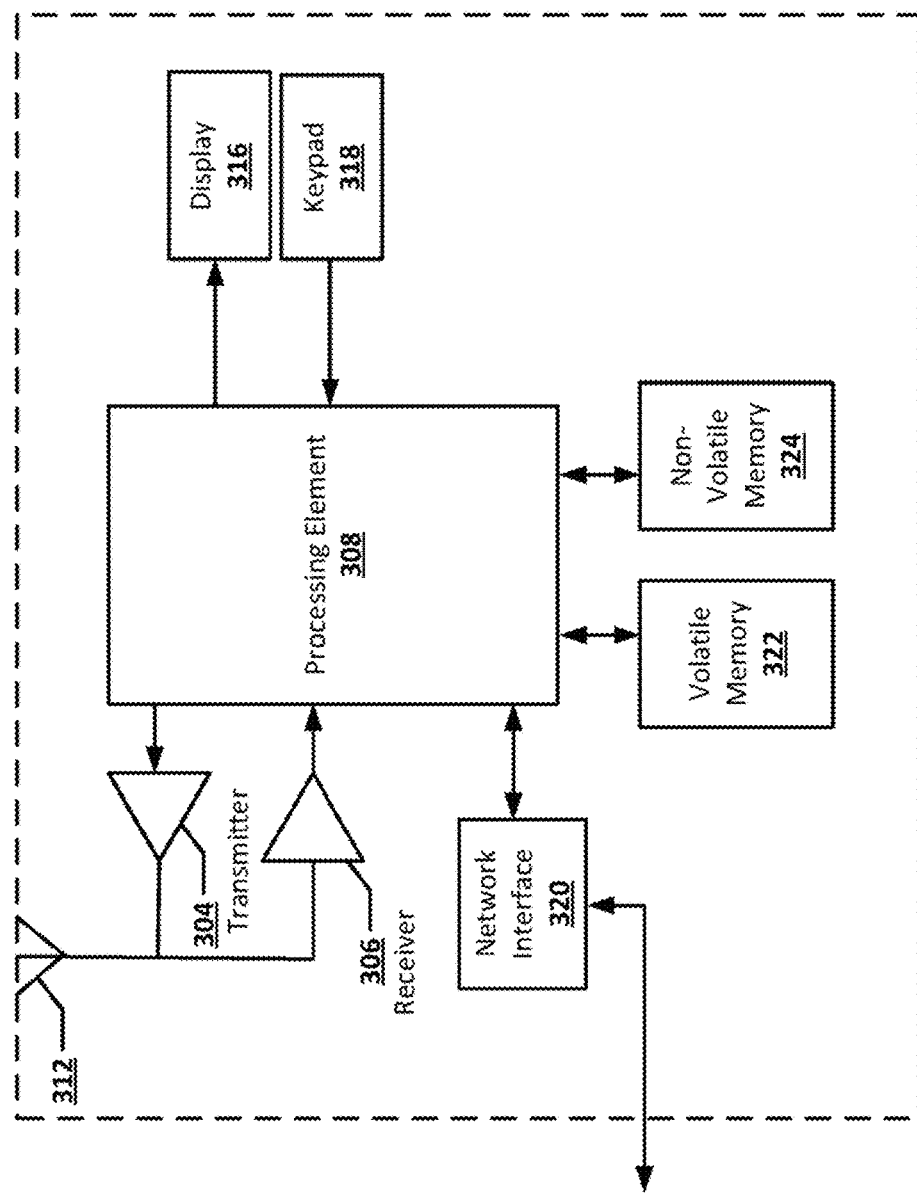

FIG. 3 provides an example client computing entity in accordance with some embodiments discussed herein.

Figure 4:
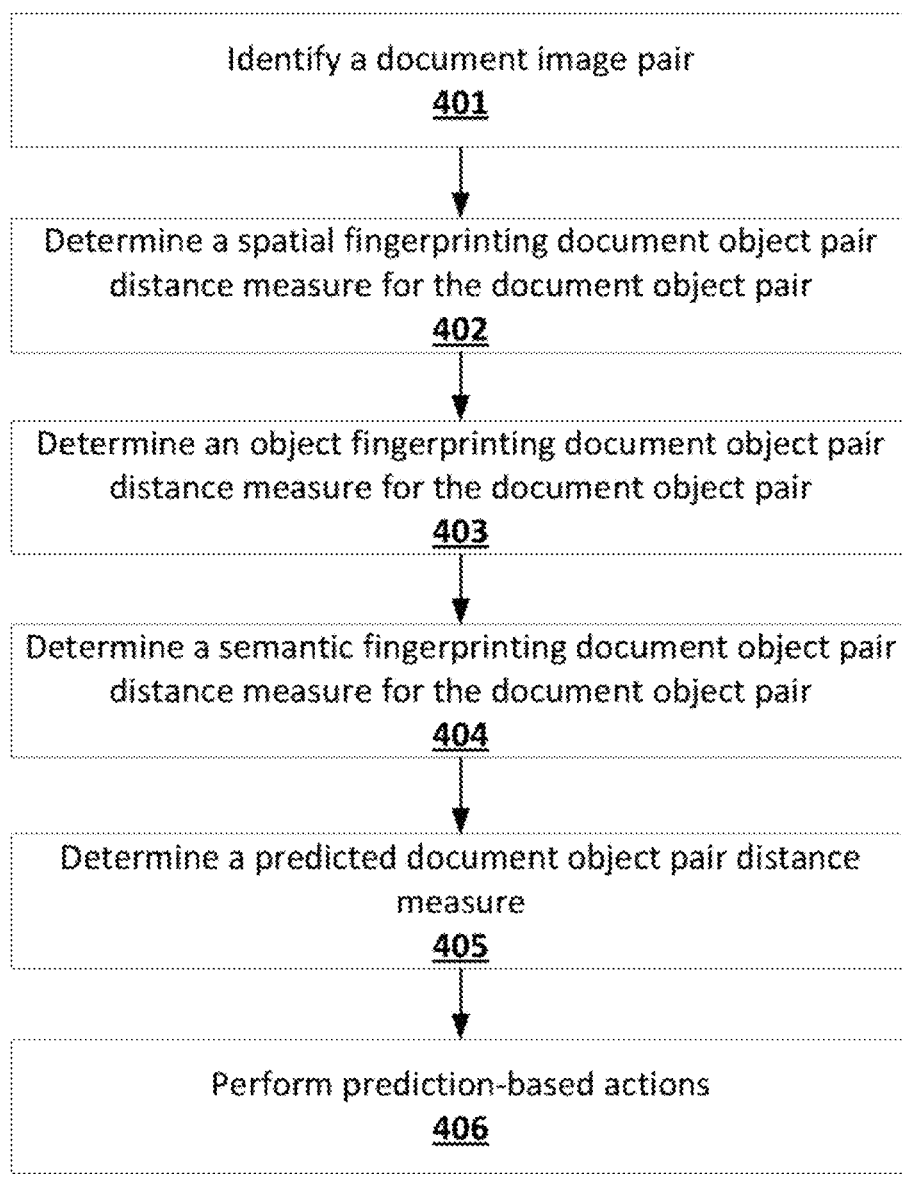

FIG. 4 is a flowchart diagram of an example process generating a predicted document image pair distance measure for a document image pair including a first document data object and a second document data object in accordance with some embodiments discussed herein.

Figure 5:
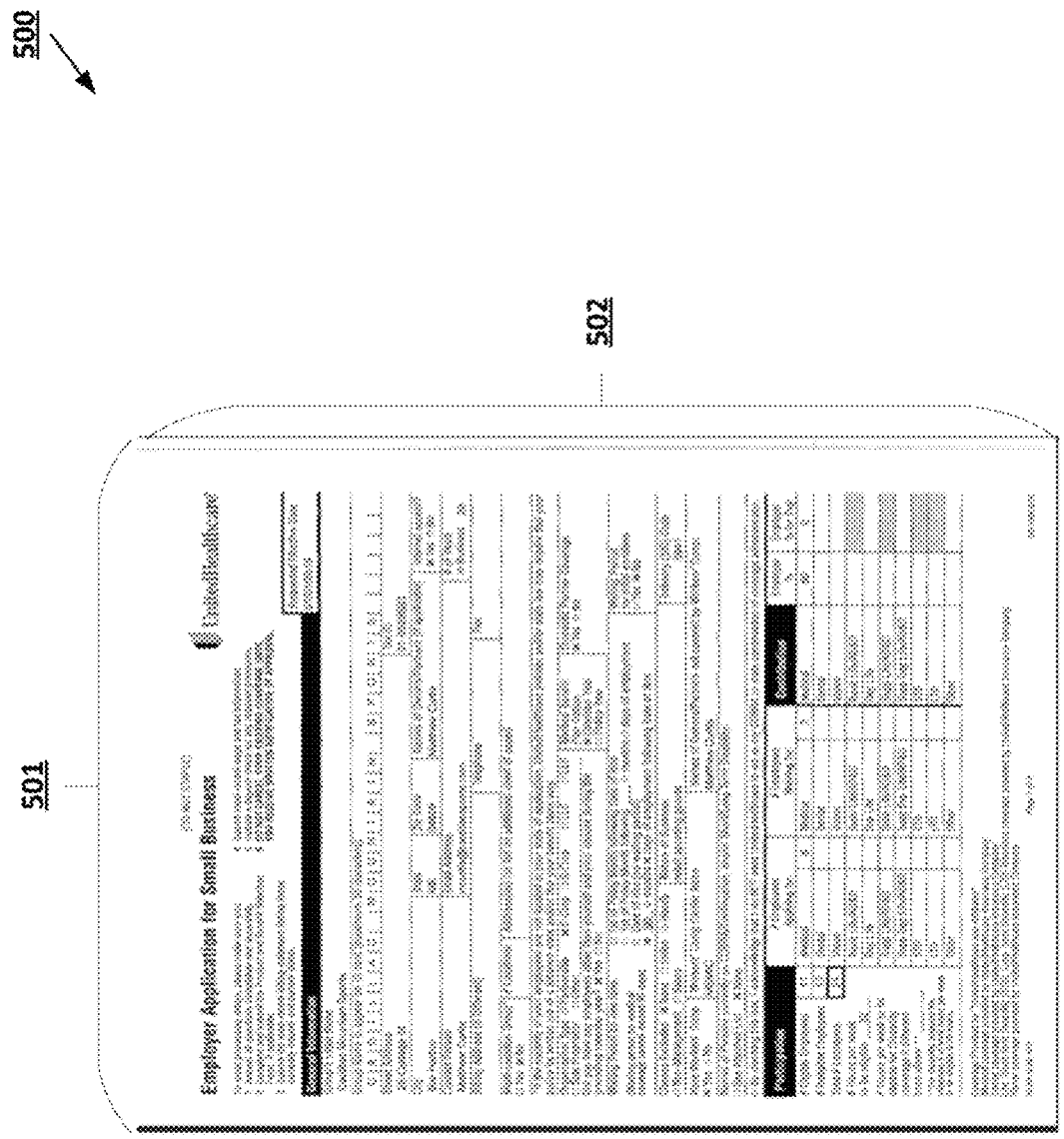

FIG. 5 provides an operational example of a two-dimensional document image data object in accordance with some embodiments discussed herein.

Figure 6:
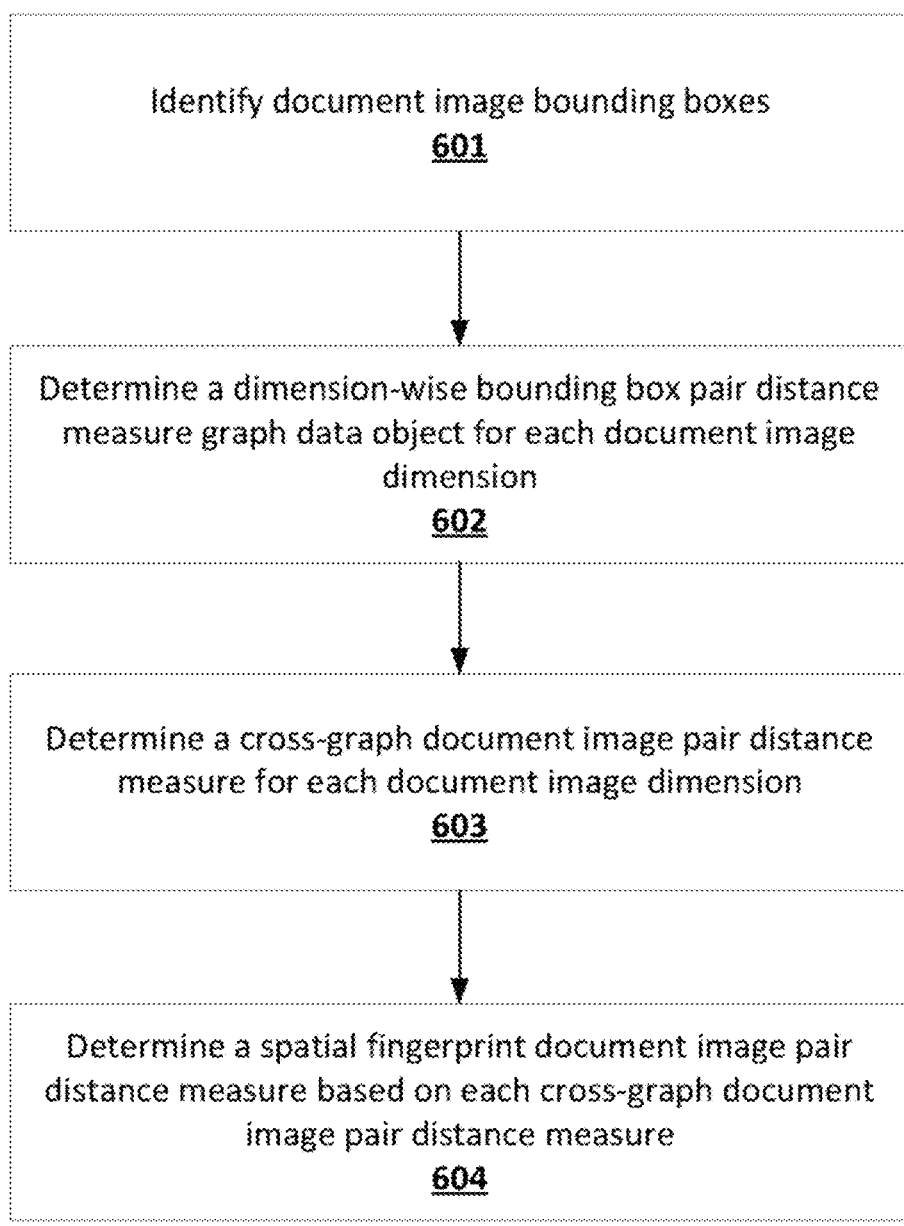

FIG. 6 is a flowchart diagram of an example process for determining a spatial fingerprinting document image pair distance measure for a document image pair in accordance with some embodiments discussed herein.

Figure 7:
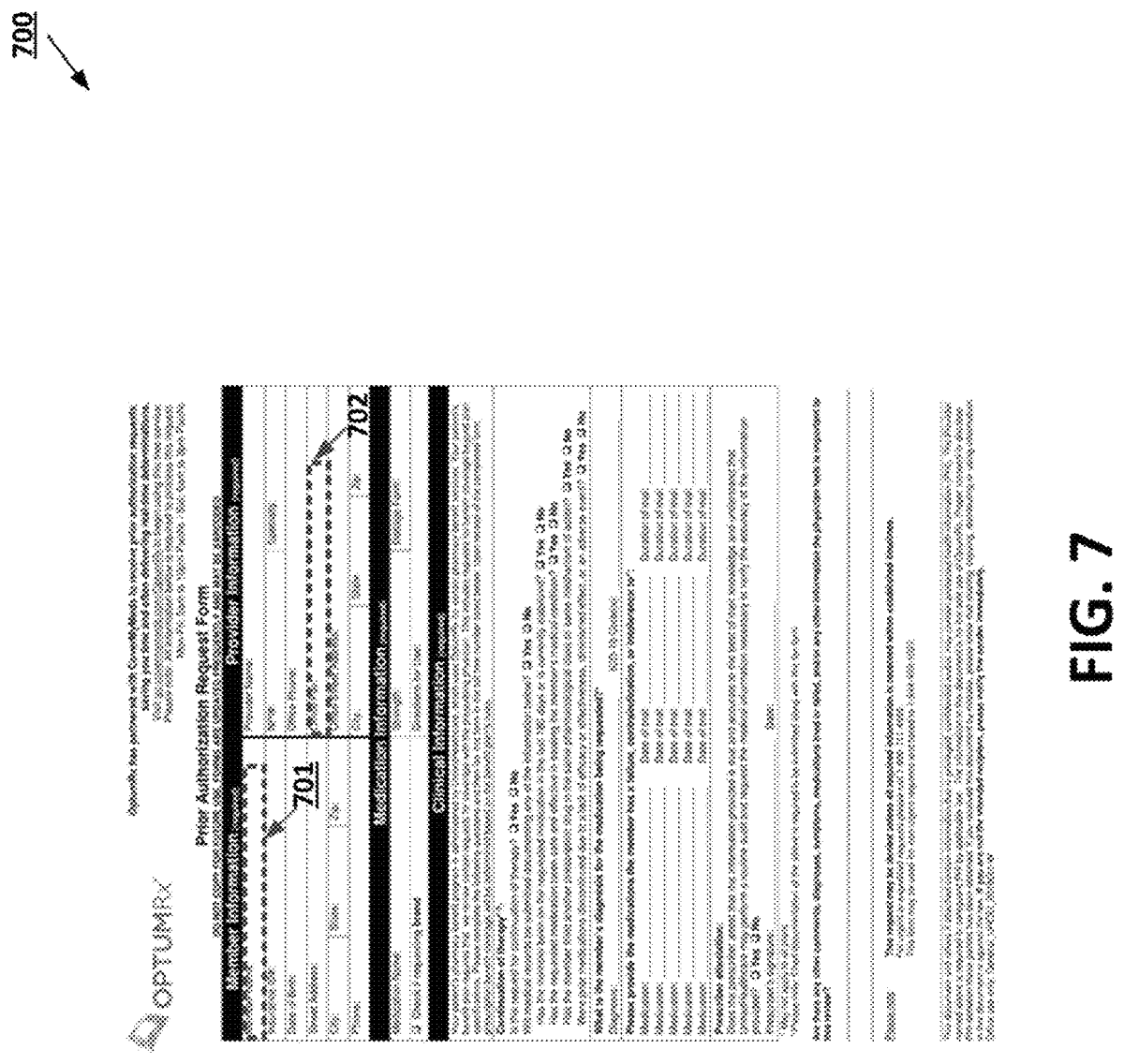

FIG. 7 provides an operational example of document image bounding boxes of a document image data object in accordance with some embodiments discussed herein.

FIG. 8 is a flowchart diagram of an example process for generating a dimension-wise bounding box pair distance measure graph data object for a first document image data object having a first set of document image bounding boxes and a first document image dimension in accordance with some embodiments discussed herein.

Figure 9:
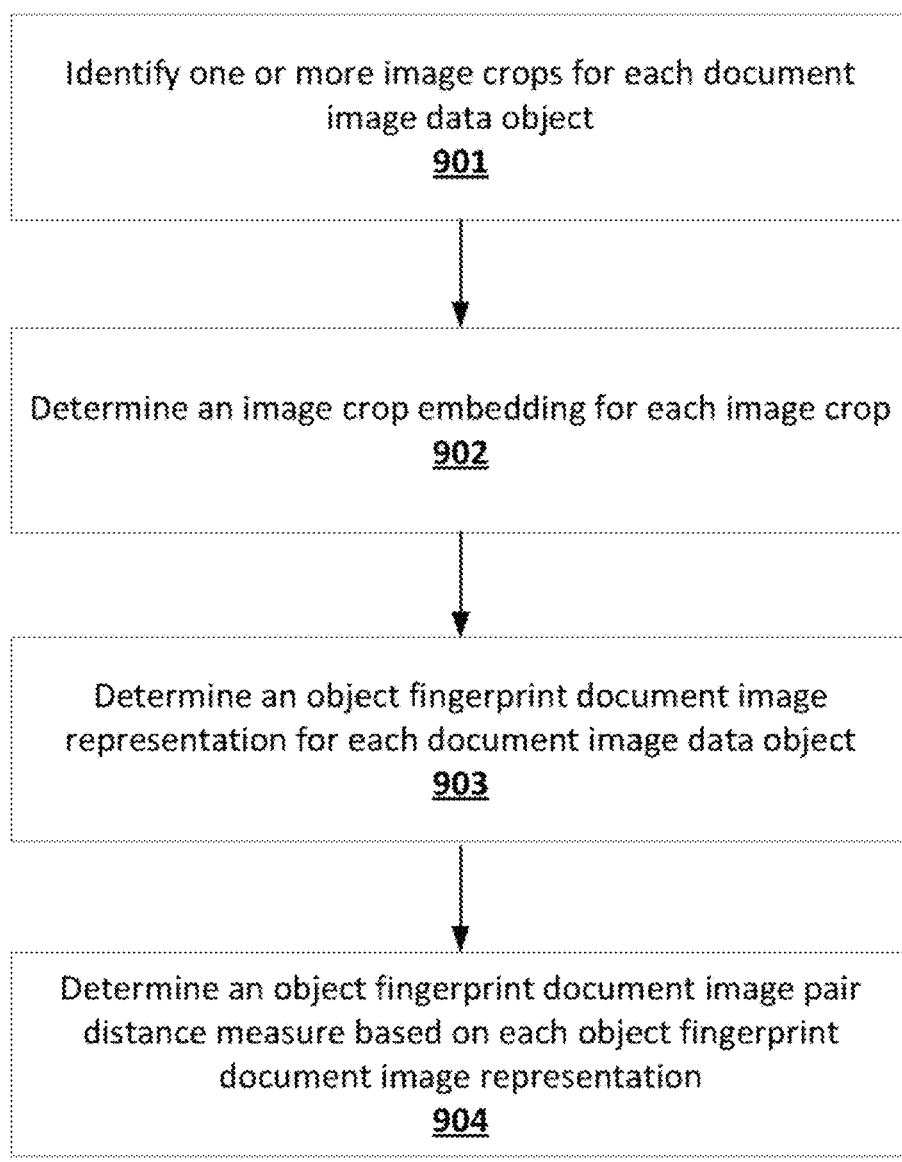

FIG. 9 is a flowchart diagram of an example process for generating an object fingerprinting document image pair distance measure for a document image pair in accordance with some embodiments discussed herein.

Figure 10:
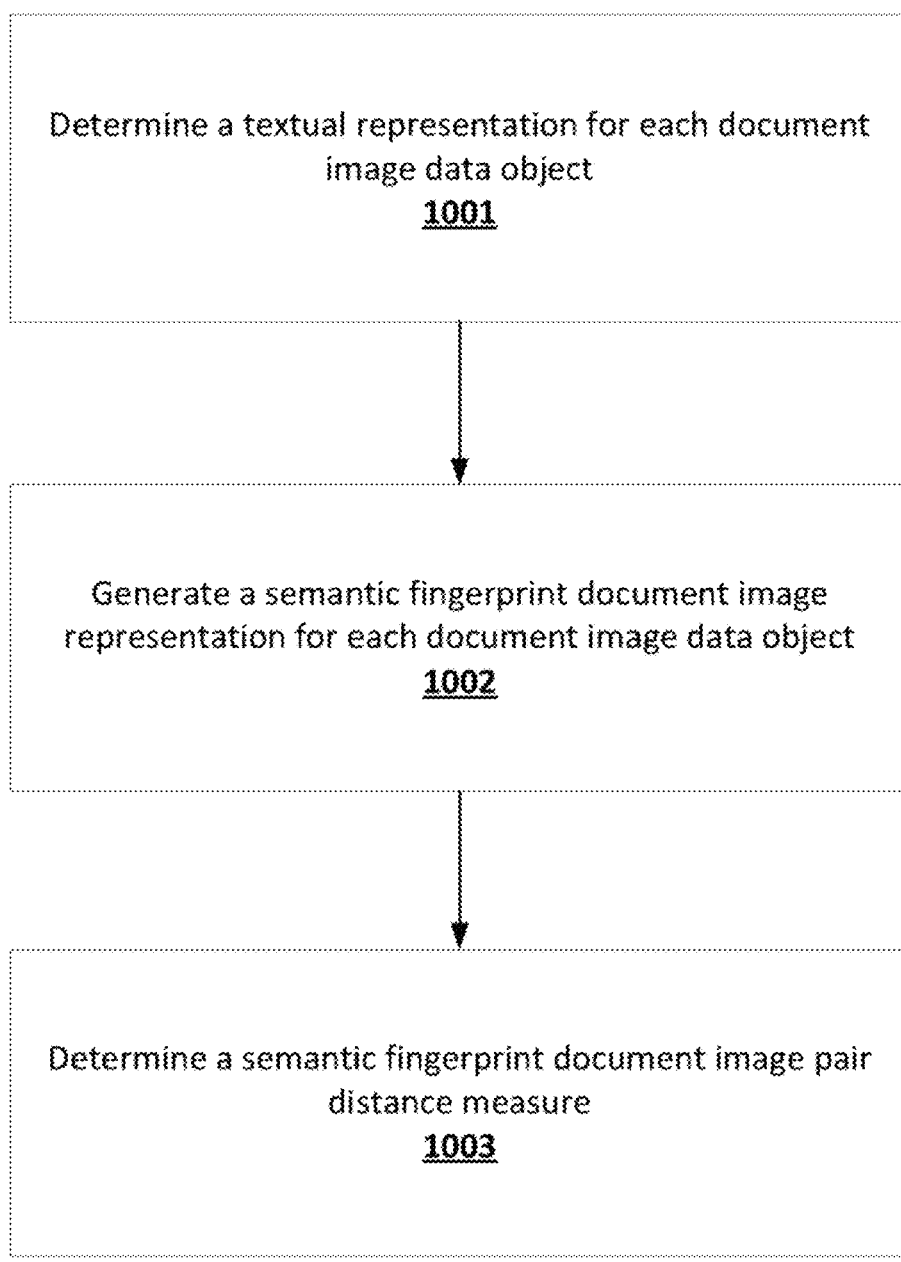

FIG. 10 is a flowchart diagram of an example process for determining a semantic fingerprint document image pair distance measure for a document image pair in accordance with some embodiments discussed herein.

Figure 11:
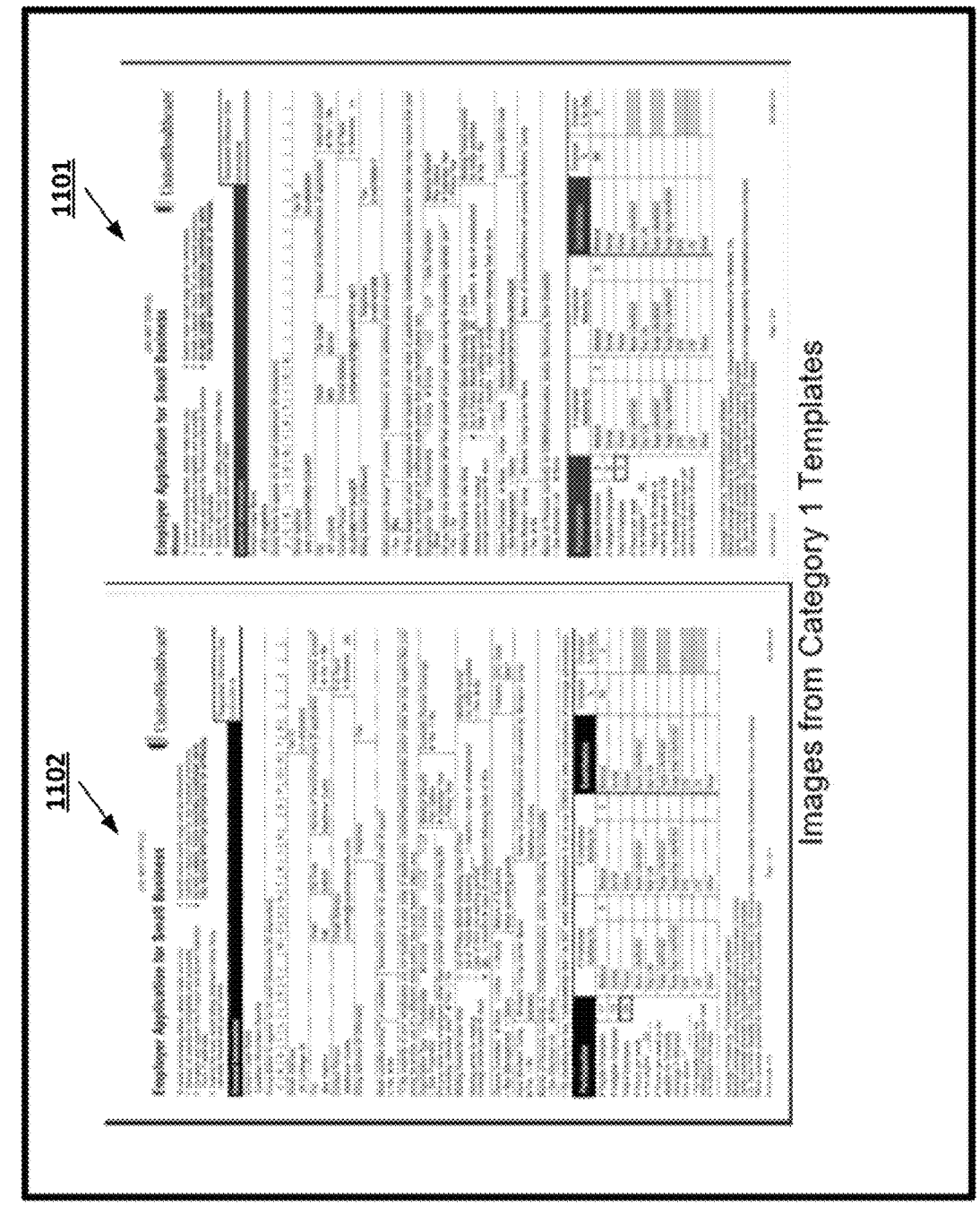
Figure 12:
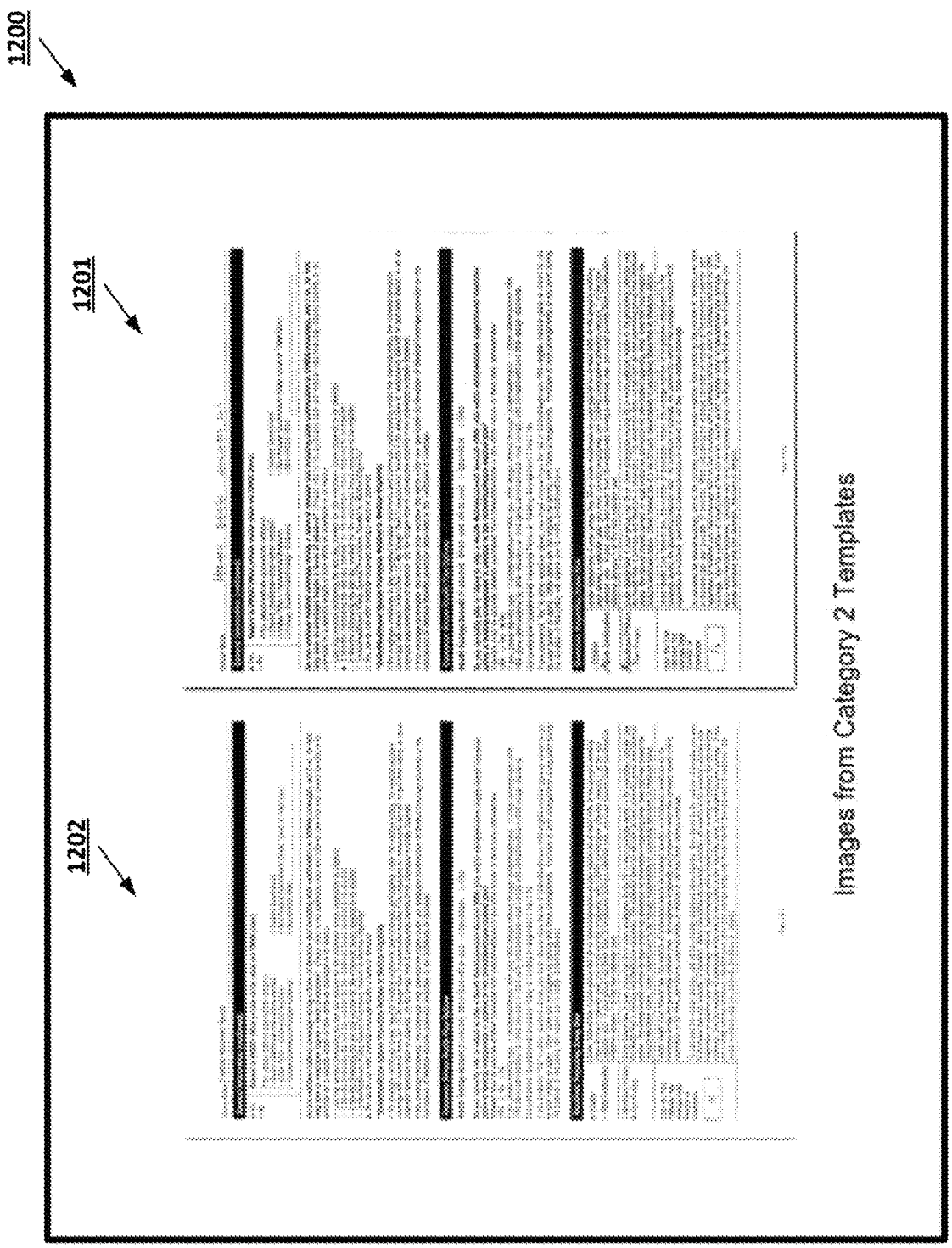
Figure 13:
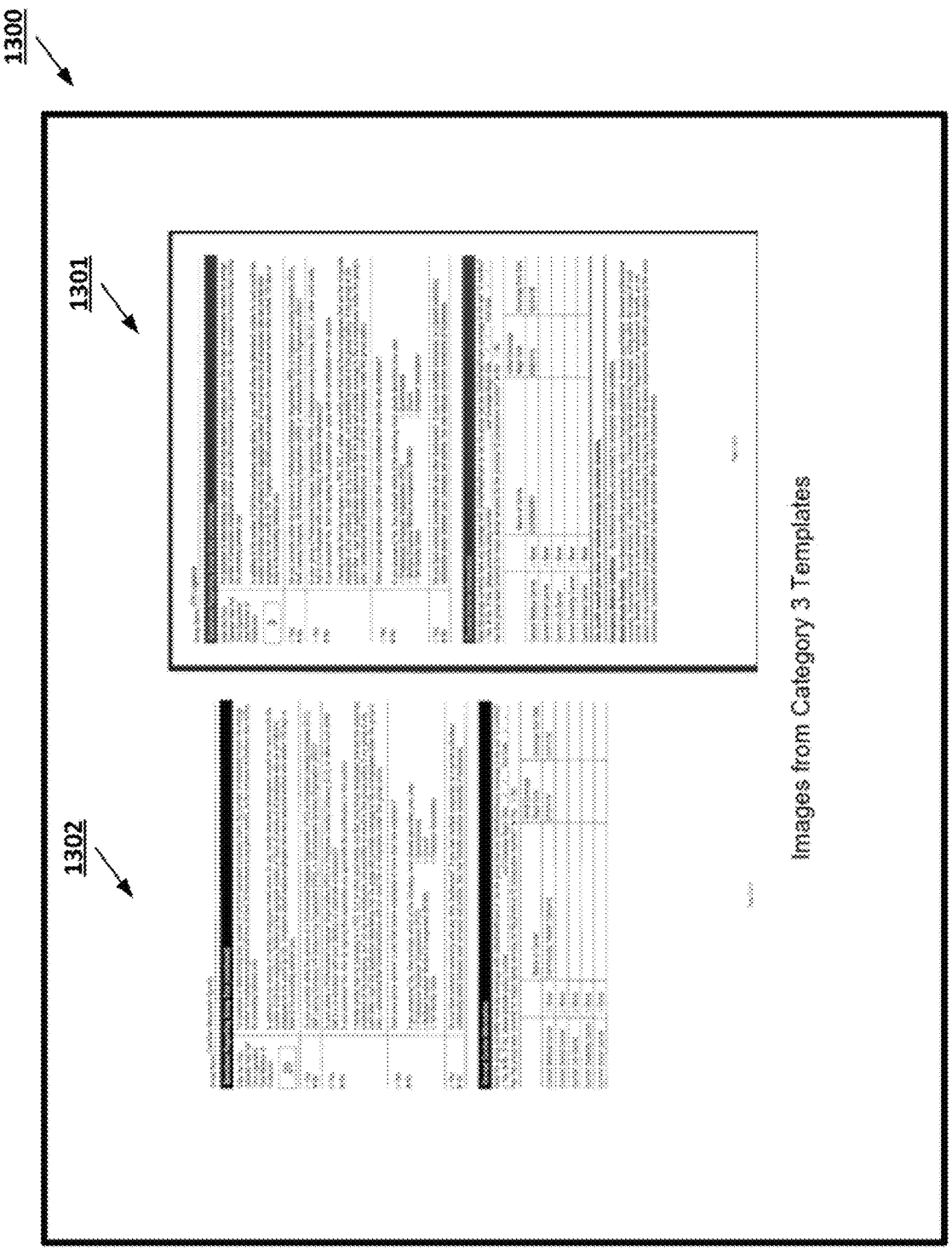

FIGS. 11-13 provide operational examples of three document image cluster depiction user interfaces in accordance with some embodiments discussed herein.

DETAILED DESCRIPTION

Various embodiments of the present invention now will be described more fully hereinafter with reference to the accompanying drawings, in which some, but not all, embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

I. OVERVIEW AND TECHNICAL IMPROVEMENTS

Various embodiments of the present invention introduce techniques for digital document analysis that utilize a combination of deep learning techniques and graph theory based approaches to efficiently and reliably infer similarities across document image data objects. For example, various embodiments of the present invention utilize systems, methods, and computer program products that perform digital document analysis using at least one of spatial fingerprint document image pair distance measures for document image pairs, object fingerprint document image pair distance measures for document image pairs, and semantic fingerprint document image pair distance measures for document image pairs. By using the noted techniques, various embodiments of the present invention enable identifying similar document image data objects, which in turn enables using similarity inferences in responding to search queries related to document image data objects. Accordingly, various embodiments of the present invention improve the computational efficiency and operational reliability of processing search queries related to document image data objects related to document image data objects, and make important contributions to improving document image server systems.

An exemplary application of various embodiments of the present invention relates to segmentation of document images based at least in part on template structures of those document images. Given a corpus of document images (e.g., scanned images of medical forms), proposed techniques extract features related to texts provided in the document images, tables provided in the document images, and spatial alignment of the texts provided in the document images and the tables provided in the document images. The extracted features are then used in accordance with a distance equation in order to generate a template similarity measure for two document images. The distance equation is in some embodiments as follows: combined_distance(D1, D2)=$p_1$*vector_distance(D1, D2)+$p_2$*statistical_distance(D1, D2)+$p_3$*matrix_distance(D1, D2), where combined_distance(D1, D2) is the template similarity measure for a first document image D1 and a second document image D2, vector_distance(D1, D2) is the similarity measure for a vector representation of the text of D1 and a vector representation of text of D2, $p_1$ is a trained weight for vector_distance(D1, D2), statistical_distance(D1, D2) is a similarity measure for a sequential representation of vector representations of words of D1 and a sequential representation of vector representations of words of D2, $p_2$ is a trained weight for statistical_distance(D1, D2), matrix_distance(D1, D2) is the similarity measure for a matrix representation of the template of D1 and the matrix representation of the template of D2, and $p_3$ is a trained weight for matrix_distance(D1, D2). In some embodiments, the p1, p2 and p3 are trained using a spatial clustering accuracy function.

In some embodiments, vector_distance(D1, D2) is calculated using the below operations: extracting the texts of D1 and D2 using object code recognition (OCR) techniques; processing each text using a Doc2Vec (or other natural language processing) model to generate a vector representation of the corresponding document image; and generating an L2 distance of the two vector representations. In some embodiments, matrix_distance(D1, D2) is calculated using the below operations: generating a bounding box image representation of each of D1 and D2; processing the bounding box image representations using an autoencoder machine learning model to generate an encoded matrix representation for each document image; and generating an L2 distance of the two encoded matrix representations. In some embodiments, statistical_distance(D1, D2) is calculated using the below operations: extracting a word sequence for each of D1 and D2 using an Optical Character Recognition (OCR) technique; for each word in a word sequence, generating a vector representation given coordinates and lags of the word so that each document image is associated with a vector representation sequence; and generating a dynamic time wrapping distance of the two vector representation sequences.

II. DEFINITIONS

The term "document image data object" may refer to a data entity that is configured to depict an image of a document that comprises text data. In some embodiments, a document image data object depicts an image of a document that comprises, in addition to text data, image data. Moreover, the text data depicted by a document image data object may include structured text data, unstructured text data, and/or semi-structured text data (such as text data in one or more tables in the depicted document). In some embodiments, a document image data object is a scanned file. In some embodiments, a document image data object is a computer-generated file. In some embodiments, the document depicted by a document image data object is a template, form, and/or the like. Accordingly, one application of at least some of the innovative concepts described herein relates to processing batches of form/template images, such as categorizing batches of form/template images into groups and directing different categories of form/template images to particular form/template processing agents.

The term "document image dimension" may refer to a data entity that is configured to describe a defined space with respect to which one spatial location property of pixels of the image corresponding to a document image data object may be described. For example, if a batch of document image data objects consist of two-dimensional images, then the document image dimensions of the noted batch may comprise a horizontal dimension and a vertical dimension. As another example, if a batch of document image data objects consist of three-dimensional images, then the document image dimensions of the noted batch may comprise a length dimension, a width dimension, and a height dimension. In some embodiments, each document image data object in a set of document image data objects may be associated with n dimension-wise bounding box pair distance measure graph data objects, where n corresponds to a count of the document image dimensions characterizing the set of document image data objects, and further where each dimension-wise bounding box pair distance measure graph data object corresponding to a document image dimension of the n document image dimensions. For example, if a batch of document image data objects consist of two-dimensional images, then the document image dimensions of the noted batch may comprise a horizontal dimension and a vertical dimension, and thus each document data object in the batch may be associated with two dimension-wise bounding box pair distance measure graph data objects: a first dimension-wise bounding box pair distance measure graph data object corresponding to the horizontal dimension and a second dimension-wise bounding box pair distance measure graph data object corresponding to the vertical dimension. As another example, if a batch of document image data objects consist of three-dimensional images, then the document image dimensions of the noted batch may comprise a length dimension, a width dimension, and a height dimension, and thus each document data object in the batch may be associated with three dimension-wise bounding box pair distance measure graph data objects: a first dimension-wise bounding box pair distance measure graph data object corresponding to the length dimension, a second dimension-wise bounding box pair distance measure graph data object corresponding to the width dimension, and a third dimension-wise bounding box pair distance measure graph data object corresponding to the height dimension.

The term "document image bounding" may refer to a data entity that is configured to describe a region of an image depicted by a corresponding document data object, such as a region that is deemed to include a similar/structurally-related set of content data. For example, in some embodiments, each portion of an image of a form document that describes the area allocated to a particular question of a form may be associated with a document image bounding box. As another example, in some embodiments, a table in an image of a document may be associated with a document image bounding box. In some embodiments, a document image bounding box may be generated/detected using an optical character recognition (OCR) engine, such as using the Azure Cognitive Service OCR engine.

The term "dimension-wise bounding box pair distance measure graph data object" may refer to a data entity that is configured to describe pairwise distance measures across bounding box pairs of the document image bounding boxes of a corresponding document image data object with respect to a corresponding document image dimension. For example, consider a two-dimensional document image data object that is associated with three document image bounding boxes BB1-B13. In the noted example, the dimension-wise bounding box pair distance measure graph data object for the noted two-dimensional document image data object with respect to a horizontal document image dimension may describe: (i) a dimension-wise bounding box pair distance measure for the bounding box pair comprising the document image bounding box BB1 and the document image bounding box BB2 with respect to the horizontal document image dimension that describes a distance (e.g., a Euclidean distance) between the document image bounding box BB1 and the document image bounding box BB2 with respect to the horizontal document image dimension; (ii) a dimension-wise bounding box pair distance measure for the bounding box pair comprising the document image bounding box BB1 and the document image bounding box BB3 with respect to the horizontal document image dimension that describes a distance (e.g., a Euclidean distance) between the document image bounding box BB1 and the document image bounding box BB3 with respect to the horizontal document image dimension; and (iii) a dimension-wise bounding box pair distance measure for the bounding box pair comprising the document image bounding box BB2 and the document image bounding box BB3 with respect to the horizontal document image dimension that describes a distance (e.g., a Euclidean distance) between the document image bounding box BB2 and the document image bounding box BB3 with respect to the horizontal document image dimension. Moreover, in the noted example, the dimension-wise bounding box pair distance measure graph data object for the noted two-dimensional document image data object with respect to a horizontal document image dimension may describe: (i) a dimension-wise bounding box pair distance measure for the bounding box pair comprising the document image bounding box BB1 and the document image bounding box BB2 with respect to the vertical document image dimension that describes a distance (e.g., a Euclidean distance) between the document image bounding box BB1 and the document image bounding box BB2 with respect to the vertical document image dimension; (ii) a dimension-wise bounding box pair distance measure for the bounding box pair comprising the document image bounding box BB1 and the document image bounding box BB3 with respect to the vertical document image dimension that describes a distance (e.g., a Euclidean distance) between the document image bounding box BB1 and the document image bounding box BB3 with respect to the vertical document image dimension; and (iii) a dimension-wise bounding box pair distance measure for the bounding box pair comprising the document image bounding box BB2 and the document image bounding box BB3 with respect to the vertical document image dimension that describes a distance (e.g., a Euclidean distance) between the document image bounding box BB2 and the document image bounding box BB3 with respect to the vertical document image dimension. In some embodiments, a dimension-wise bounding box pair distance measure graph data object that is associated with a corresponding document image data object and a corresponding document image dimension describe a graph that comprises a set of nodes and a set of edges each associated with a pair of nodes, where: (i) each node of the graph corresponds to a document image bounding box of the corresponding document image data object, and (ii) each edge of the graph that corresponds to a node pair describes the dimension-wise bounding box pair distance measure for the bounding box pair associated with the node pair with respect to the corresponding document image dimension.

The term "dimension-wise mean coordinate" may refer to a data entity that is configured to describe a singular-valued measure of location of a corresponding document image bounding box with respect to a corresponding document image coordinate. In some embodiments, the dimension-wise mean coordinate for a corresponding document image bounding box with respect to a corresponding document image coordinate is determined based at least in part on: (i) a right-bottom coordinate for the first document image bounding box with respect to the corresponding document image dimension that describes a coordinate value of a location of the most right-bottom point of the first document image bounding box that corresponds to the document image dimension, and (ii) a left-top coordinate for the first document image bounding box with respect to the corresponding document image dimension that describes a coordinate value of a location of the most left-top point of the first document image bounding box that corresponds to the document image dimension. For example, if the right-bottom coordinate of a two-dimensional document image bounding box is located at $(x_1, y_1)$ and the right-bottom coordinate of the two-dimensional document image bounding box is located at $(x_2, y_2)$, then the dimension-wise mean coordinate for the two-dimensional document image bounding box with respect to a horizontal document image dimension may be determined based at least in part on $x_1$ and $x_2$. As another example, if the right-bottom coordinate of a two-dimensional document image bounding box is located at $(x_1, y_1)$ and the right-bottom coordinate of the two-dimensional document image bounding box is located at $(x_2, y_2)$, then the dimension-wise mean coordinate for the two-dimensional document image bounding box with respect to a vertical document image dimension may be determined based at least in part on $y_1$ and $y_2$. In some embodiments, given a right-bottom coordinate $z_1$ for a first document image bounding box with respect to a selected document image dimension and a left-top coordinate $z_2$ for the first document image bounding box with respect to the selected document image dimension, the dimension-wise mean coordinate for the first document image bounding box with respect to the selected image dimension may be determined based at least in part on the output of the equation $(z_1+z_2)^2$.

The term "dimension-wise bounding box pair distance measure" may refer to a data entity that is configured to describe a measure of distance between the dimension-wise mean coordinate for the first document image bounding box in the bounding box pair with respect to a corresponding document image dimension and the dimension-wise mean coordinate for the second document image bounding box in the bounding box pair with respect to the corresponding document image dimension, such as Euclidean distance measure between the dimension-wise mean coordinate for the first document image bounding box in the bounding box pair with respect to the corresponding document image dimension and the dimension-wise mean coordinate for the second document image bounding box in the bounding box pair with respect to the corresponding document image dimension. In some embodiments, given an n-dimensional bounding box pair that comprises a first n-dimensional document image bounding box having a dimension-wise mean coordinate $c_1$ with respect to a selected document image dimension and a second n-dimensional document image bounding box having a dimension-wise mean coordinate $c_2$ with respect to the selected document image dimension, the dimension-wise bounding box pair distance measures for the n-dimensional bounding box pair with respect to the selected document image dimension is determined based at least in part on the output of $(c_1-c_2)^2$. For example, given a two-dimensional bounding box pair that comprises a first two-dimensional document image bounding box having a dimension-wise mean coordinate $h_1$ with respect to a horizontal document image dimension and a second two-dimensional document image bounding box having a dimension-wise mean coordinate $h_2$ with respect to the horizontal document image dimension, the dimension-wise bounding box pair distance measures for the two-dimensional bounding box pair with respect to the horizontal document image dimension may be determined based at least in part on the output of $(h_1-h_2)^2$. As another example, given a two-dimensional bounding box pair that comprises a first two-dimensional document image bounding box having a dimension-wise mean coordinate $v_1$ with respect to a vertical document image dimension and a second two-dimensional document image bounding box having a dimension-wise mean coordinate $v_2$ with respect to the vertical document image dimension, the dimension-wise bounding box pair distance measures for the two-dimensional bounding box pair with respect to the vertical document image dimension may be determined based at least in part on the output of $(v_1-v_2)^2$.

The term "cross-graph document image pair distance measure" may refer to a data entity that is configured to describe a measure of difference between two dimension-wise bounding box pair distance measure graph data objects for a corresponding document image dimension, where each of the two dimension-wise bounding box pair distance measure graph data objects may correspond to one of the document image data objects of the two document image data objects in a corresponding document image pair. In some embodiments, each document image dimension is (in relation to a particular document image pair) associated with two dimension-wise bounding box pair distance measure graph data objects, one corresponding to the first document image data object in the document image pair and one corresponding to the second document image data object in the document image pair. In some embodiments, the cross-graph document image pair distance measure for the particular document image pair and the particular document image dimension is determined based at least in part on a measure of graph deviation between the two noted dimension-wise bounding box pair distance measure graph data objects. In some embodiments, a measure of graph deviation is determined based at least in part on a graph edit distance measure of the corresponding graphs, and thus determining the cross-graph document image pair distance measure between a first dimension-wise bounding box pair distance measure graph data object and a second dimension-wise bounding box pair distance measure graph data object comprises determining a graph edit document image pair distance measure between the first dimension-wise bounding box pair distance measure graph data object and the second dimension-wise bounding box pair distance measure graph data object. In some embodiments, a graph edit distance measure for two graphs may be calculated in accordance with the at least some of the techniques that are described in Blumental, *New Techniques for Graph Edit Distance Computation* (2019), arXiv:1908.00265 [cs.DS], available online at https://arxiv.org/ftp/arxiv/papers/1908/1908.00265.pdf.

The term "spatial fingerprint document image pair distance measure" may refer to a data entity that is configured to describe a measure of deviation between locational configuration of one or more detected elements of a first document image data object in a corresponding document image pair and locational configuration of one or more detected elements of a second document image data object in the corresponding document image pair. In some embodiments, given an n-dimensional document image pair, the document image pair is associated with n cross-graph document image pair distance measure, where each of the n cross-graph document image pair distance measures is associated with a document image dimension of the n document image dimensions. In some embodiments, the n cross-graph document image pair distance measures are aggregated in a defined manner to generate the spatial fingerprint document image pair distance measure for the document image pair. In some embodiments, the n cross-graph document image pair distance measures are provided as inputs to a trained supervised machine learning model that is configured to generate the spatial fingerprint document image pair distance measure for the document image pair as the output of the trained supervised machine learning model. In some embodiments, given a document image pair consisting of two document image data objects each having two document image dimensions, a computing entity may: (i) generate a first dimension-wide bounding box pair distance measure graph data object for a first document image data object in the document image pair with respect to a first document image dimension of the two document image dimensions, (ii) generate a second dimension-wide bounding box pair distance measure graph data object for a second document image data object in the document image pair with respect to the first document image dimension of the two document image dimensions, (iii) generate a third dimension-wide bounding box pair distance measure graph data object for the first document image data object in the document image pair with respect to a second document image dimension of the two document image dimensions, (iv) generate a fourth dimension-wide bounding box pair distance measure graph data object for the second document image data object in the document image pair with respect to the second document image dimension of the two document image dimensions, (v) generate a first cross-graph document image pair distance measure for the first document image dimension of the two document image dimensions based at least in part on the first dimension-wide bounding box pair distance measure graph data object and the second dimension-wide bounding box pair distance measure graph data object, (vi) generate a second cross-graph document image pair distance measure for the second document image dimension of the two document image dimensions based at least in part on the third dimension-wide bounding box pair distance measure graph data object and the fourth dimension-wide bounding box pair distance measure graph data object, and (vii) generate the spatial fingerprint document image pair distance measure based at least in part on the first cross-graph document image pair distance measure and the second cross-graph document image pair distance measure. In some embodiments, the spatial fingerprint document image pair distance measure for an n-dimensional document image pair is selected based at least in part on the maximum value of the n cross-graph document image pair distance measures associated with the document image pair.

The term "object fingerprint document image representation" may refer to a data entity that is configured to describe a representation of a corresponding document image data object that is determined based at least in part on each image crop embedding that is associated with an image crop of the document image data object. For example, in some embodiments, given a document image pair that comprises a first document image data object having a first set of three document image bounding boxes and a second document image data object having a second set of four document image bounding boxes, a computing entity may: (i) process an image crop representation of the first document image bounding box of the first document image data object using an image encoding machine learning model to generate a first image crop embedding for the first document image bounding box of the first document image data object, (ii) process an image crop representation of the second document image bounding box of the first document image data object using the image encoding machine learning model to generate a second image crop embedding for the second document image bounding box of the first document image data object, (iii) process an image crop representation of the third document image bounding box of the first document image data object using the image encoding machine learning model to generate a third image crop embedding for the third document image bounding box of the first document image data object, (iv) process an image crop representation of the first document image bounding box of the second document image data object using the image encoding machine learning model to generate a fourth image crop embedding for the first document image bounding box of the second document image data object, (v) process an image crop representation of the second document image bounding box of the second document image data object using the image encoding machine learning model to generate a fifth image crop embedding for the second document image bounding box of the second document image data object, (vi) process an image crop representation of the third document image bounding box of the second document image data object using the image encoding machine learning model to generate a sixth image crop embedding for the third document image bounding box of the second document image data object, (vii) process an image crop representation of the fourth document image bounding box of the second document image data object using the image encoding machine learning model to generate a seventh image crop embedding for the fourth document image bounding box of the second document image data object, (viii) generate a first object fingerprint document image representation for the first document image data object based at least in part on the first image crop embedding, the second image crop embedding, and the third image crop embedding, and (ix) generate a second object fingerprint document image representation for the second document image data object based at least in part on the fourth image crop embedding, the fifth image crop embedding, the sixth image crop embedding, and the seventh image crop embedding. In some embodiments, an object fingerprint document image representation describes an m×n matrix, where m corresponds to the number of image crops of the associated document image data object, n corresponds to the size of the image crop embeddings generated by an image encoder machine learning model, and each row of the m×n describes an image crop embedding for an image crop of the associated document image data object.

The term "object fingerprint document image pair distance measure" may refer to a data entity that is configured to describe a measure of difference between two document image data objects in a corresponding document image pair that is determined based at least in part on each object fingerprint document image representation for a document image data object in the corresponding document image pair. In some embodiments, a document image pair is associated with two object fingerprint document image representations each associated with a document image data object in the document image pair. In some embodiments, the object fingerprint document image pair distance measure for a document image pair is determined based at least in part on a measure of difference between the two object fingerprint document image representations associated with the document image pair, such as an L2 distance measures between matrices described by the two object fingerprint document image representations associated with the document image pair (where each matrix corresponds to a document image data object in the document image pair). In some embodiments, determining the object fingerprint document image pair distance measure based at least in part on a first object fingerprint document image representation and a second object fingerprint document image representation comprises performing a transposition operation on the second object fingerprint document image representation to generate a transposed object fingerprint document image representation; and determining the object fingerprint document image pair distance measure based at least in part on an L2 document image pair distance measure between first object fingerprint document image representation and the transposed object fingerprint document image representation.

The term "predicted document image pair distance measure" may refer to a data entity that is configured to describe a predicted measure of deviation between two document image data objects associated with a document image pair, where the predicted measure of deviation may integrate both deviations or similarities between structures of the two document image data objects as well as contents of the two document image data objects. In some embodiments, a computing entity generates the predicted document image pair distance measure for a document image pair by combining the spatial fingerprint document image pair distance measure for the document image pair, the object fingerprint document image pair distance measure for the document image pair, and the semantic fingerprint document. In some embodiments, a computing entity generates the predicted document image pair distance measure for a document image pair by providing the spatial fingerprint document image pair distance measure for the document image pair, the object fingerprint document image pair distance measure for the document image pair, and the semantic fingerprint document for the document image pair to a trained supervised machine learning model that is configured to generate the predicted document image pair distance measure based at least in part on processing the spatial fingerprint document image pair distance measure for the document image pair, the object fingerprint document image pair distance measure for the document image pair, and the semantic fingerprint document for the document image pair. In some embodiments, given a spatial fingerprint document image pair distance measure S, an object fingerprint document image pair distance measure O, and a semantic fingerprint document image pair distance measure T, the predicted document image pair distance measure P for a corresponding document image pair may be calculated based at least in part on the equation $P=S+O+T$. In some embodiments, given a spatial fingerprint document image pair distance measure S, an object fingerprint document image pair distance measure O, and a set of cross-graph document image pair distance measures $\{d_1, \ldots, d_n\}$ for n document image dimensions of a corresponding document image pair, then the predicted document image pair distance measure P for the corresponding document image pair may be calculated based at least in part on the equation $P=S+O+\max(d_1, \ldots, d_n)$. For example, given a spatial fingerprint document image pair distance measure S, an object fingerprint document image pair distance measure O, and a set of cross-graph document image pair distance measures $\{d_{vertical}, h_{horizontal}\}$ for two document image dimensions of a corresponding document image pair, then the predicted document image pair distance measure P for the corresponding document image pair may be calculated based at least in part on the equation $P=S+O+\max(d_{vertical}, h_{horizontal})$.

III. COMPUTER PROGRAM PRODUCTS, METHODS, AND COMPUTING ENTITIES

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations. Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. EXEMPLARY SYSTEM ARCHITECTURE

FIG. 1 is a schematic diagram of an example architecture 100 for performing predictive data analysis. The architecture 100 includes a predictive data analysis system 101 configured to receive predictive data analysis requests from client computing entities 102, process the predictive data analysis requests to generate predictions, provide the generated predictions to the client computing entities 102, and automatically perform prediction-based actions based at least in part on the generated predictions. An example of a prediction-based action that can be performed using the predictive data analysis system 101 is categorizing a group of document image data objects.

In some embodiments, predictive data analysis system 101 may communicate with at least one of the client computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The predictive data analysis system 101 may include a predictive data analysis computing entity 106 and a storage subsystem 108. The predictive data analysis computing entity 106 may be configured to receive predictive data analysis requests from one or more client computing entities 102, process the predictive data analysis requests to generate predictions corresponding to the predictive data analysis requests, provide the generated predictions to the client computing entities 102, and automatically perform prediction-based actions based at least in part on the generated predictions.

The storage subsystem 108 may be configured to store input data used by the predictive data analysis computing entity 106 to perform predictive data analysis as well as model definition data used by the predictive data analysis computing entity 106 to perform various predictive data analysis tasks. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Exemplary Predictive Data Analysis Computing Entity

FIG. 2 provides a schematic of a predictive data analysis computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the predictive data analysis computing entity 106 may include, or be in communication with, one or more processing elements 205 (also referred to as processors, processing circuitry, and/or similar terms used herein interchangeably) that communicate with other elements within the predictive data analysis computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the predictive data analysis computing entity 106 may further include, or be in communication with, non-volatile media (also referred to as non-volatile storage, memory, memory storage, memory circuitry and/or similar terms used herein interchangeably). In one embodiment, the non-volatile storage or memory may include one or more non-volatile storage or memory media 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the predictive data analysis computing entity 106 may further include, or be in communication with, volatile media (also referred to as volatile storage, memory, memory storage, memory circuitry and/or similar terms used herein interchangeably). In one embodiment, the volatile storage or memory may also include one or more volatile storage or memory media 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data analysis computing entity 106 with the assistance of the processing element 205 and operating system.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive data analysis computing entity 106 may include, or be in communication with, one or more input elements, such as a keyboard input, a mouse input, a touch screen/display input, motion input, movement input, audio input, pointing device input, joystick input, keypad input, and/or the like. The predictive data analysis computing entity 106 may also include, or be in communication with, one or more output elements (not shown), such as audio output, video output, screen/display output, motion output, movement output, and/or the like.

Exemplary Client Computing Entity

FIG. 3 provides an illustrative schematic representative of an client computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Client computing entities 102 can be operated by various parties. As shown in FIG. 3, the client computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing entity 102 may be capable of operating with one or more air interface standards, communication protocols, modulation types, and access types. More particularly, the client computing entity 102 may operate in accordance with any of a number of wireless communication standards and protocols, such as those described above with regard to the predictive data analysis computing entity 106. In a particular embodiment, the client computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 102 may operate in accordance with multiple wired communication standards and protocols, such as those described above with regard to the predictive data analysis computing entity 106 via a network interface 320.

Via these communication standards and protocols, the client computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client computing entity 102 can also download changes, add-ons, and updates, for instance, to its firmware, software (e.g., including executable instructions, applications, program modules), and operating system.

According to one embodiment, the client computing entity 102 may include location determining aspects, devices, modules, functionalities, and/or similar words used herein interchangeably. For example, the client computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the client computing entity's 102 position in connection with a variety of other systems, including cellular towers, Wi-Fi access points, and/or the like. Similarly, the client computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The client computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the client computing entity 102 to interact with and/or cause display of information/data from the predictive data analysis computing entity 106, as described herein. The user input interface can comprise any of a number of devices or interfaces allowing the client computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the client computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The client computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the client computing entity 102. As indicated, this may include a user application that is resident on the entity or accessible through a browser or other user interface for communicating with the predictive data analysis computing entity 106 and/or various other computing entities.

In another embodiment, the client computing entity 102 may include one or more components or functionality that are the same or similar to those of the predictive data analysis computing entity 106, as described in greater detail above. As will be recognized, these architectures and descriptions are provided for exemplary purposes only and are not limiting to the various embodiments.

In various embodiments, the client computing entity 102 may be embodied as an artificial intelligence (AI) computing entity, such as an Amazon Echo, Amazon Echo Dot, Amazon Show, Google Home, and/or the like. Accordingly, the client computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. EXEMPLARY SYSTEM OPERATIONS

Various embodiments of the present invention introduce techniques for digital document analysis that utilize a combination of supervised machine learning techniques and unsupervised machine learning techniques to efficiently and reliably infer similarities across document image data objects. For example, various embodiments of the present invention utilize systems, methods, and computer program products that perform digital document analysis using at least one of spatial fingerprint document image pair distance measures for document image pairs, object fingerprint document image pair distance measures for document image pairs, and semantic fingerprint document image pair distance measures for document image pairs. By using the noted techniques, various embodiments of the present invention enable identifying similar document image data objects, which in turn enables using similarity inferences in responding to search queries related to document image data objects. Accordingly, various embodiments of the present invention improve the computational efficiency and operational reliability of processing search queries related to document image data objects related to document image data objects, and make important contributions to improving document image server systems.

FIG. 4 is a flowchart diagram of an example process 400 for generating a predicted document image pair distance measure for a document image pair including a first document data object and a second document data object. Via the various steps/operations of the process 400, the predictive data analysis computing entity 106 (which may comprise one or more computers) may efficiently and reliably generate distance/similarity measures for pairs of document image data objects, where the noted distance/similarity measures can then be used to categorize/cluster a set of document image data objects.

The process 400 begins at step/operation 401 when the predictive data analysis computing entity 106 identifies the document image pair. In some embodiments, the predictive data analysis computing entity 106 selects the document image pair from a set of document image data objects. In some embodiments, each document image data object in the mentioned set of document image data objects, such that the set of the document image data objects can be said to be characterized by a set of document image dimensions. Document image data objects and document image dimensions are discussed in greater detail below.

A document image data object may depict an image of a document that comprises text data. In some embodiments, a document image data object depicts an image of a document that comprises, in addition to text data, image data. Moreover, the text data depicted by a document image data object may include structured text data, unstructured text data, and/or semi-structured text data (such as text data in one or more tables in the depicted document). In some embodiments, a document image data object is a scanned file. In some embodiments, a document image data object is a computer-generated file. In some embodiments, the document depicted by a document image data object is a template, form, and/or the like. Accordingly, one application of at least some of the innovative concepts described herein relates to processing batches of form/template images, such as categorizing batches of form/template images into groups and directing different categories of form/template images to particular form/template processing agents. An operational example of a two-dimensional document image data object 500 is depicted in FIG. 5. As depicted in FIG. 5, the two-dimensional document image data object 500 is associated with a horizontal document image dimension 501 and a vertical document image dimension 502.

A document image dimension may describe a defined space with respect to which one spatial location property of pixels of the image corresponding to a document image data object may be described. For example, if a batch of document image data objects consist of two-dimensional images, then the document image dimensions of the noted batch may comprise a horizontal dimension and a vertical dimension. As another example, if a batch of document image data objects consist of three-dimensional images, then the document image dimensions of the noted batch may comprise a length dimension, a width dimension, and a height dimension. In some embodiments, each document image data object in a set of document image data objects may be associated with n dimension-wise bounding box pair distance measure graph data objects, where n corresponds to a count of the document image dimensions characterizing the set of document image data objects, and further where each dimension-wise bounding box pair distance measure graph data object corresponding to a document image dimension of the n document image dimensions. For example, if a batch of document image data objects consist of two-dimensional images, then the document image dimensions of the noted batch may comprise a horizontal dimension and a vertical dimension, and thus each document data object in the batch may be associated with two dimension-wise bounding box pair distance measure graph data objects: a first dimension-wise bounding box pair distance measure graph data object corresponding to the horizontal dimension and a second dimension-wise bounding box pair distance measure graph data object corresponding to the vertical dimension. As another example, if a batch of document image data objects consist of three-dimensional images, then the document image dimensions of the noted batch may comprise a length dimension, a width dimension, and a height dimension, and thus each document data object in the batch may be associated with three dimension-wise bounding box pair distance measure graph data objects: a first dimension-wise bounding box pair distance measure graph data object corresponding to the length dimension, a second dimension-wise bounding box pair distance measure graph data object corresponding to the width dimension, and a third dimension-wise bounding box pair distance measure graph data object corresponding to the height dimension.

At step/operation 402, the predictive data analysis computing entity 106 determines a spatial fingerprinting document image pair distance measure for the document image pair. In some embodiments, to determine the spatial fingerprinting document image pair distance measure for the document image pair, the predictive data analysis computing entity 106 determines a dimension-wise bounding box pair distance measure graph data object for each document image data object in the document image pair with respect to each document image dimension of the document image pair, then determines a cross-graph document image pair distance measure between each dimension-wise bounding box pair distance measure graph data object for each document image dimension of the document image pair, and then determines a spatial fingerprint document image pair distance measure for the document image pair based at least in part on each cross-graph document image pair distance measure.

For example, given a document image pair consisting of two document image data objects each having two document image dimensions, the predictive data analysis computing entity 106 may: (i) generate a first dimension-wide bounding box pair distance measure graph data object for a first document image data object in the document image pair with respect to a first document image dimension of the two document image dimensions, (ii) generate a second dimension-wide bounding box pair distance measure graph data object for a second document image data object in the document image pair with respect to the first document image dimension of the two document image dimensions, (iii) generate a third dimension-wide bounding box pair distance measure graph data object for the first document image data object in the document image pair with respect to a second document image dimension of the two document image dimensions, (iv) generate a fourth dimension-wide bounding box pair distance measure graph data object for the second document image data object in the document image pair with respect to the second document image dimension of the two document image dimensions, (v) generate a first cross-graph document image pair distance measure for the first document image dimension of the two document image dimensions based at least in part on the first dimension-wide bounding box pair distance measure graph data object and the second dimension-wide bounding box pair distance measure graph data object, (vi) generate a second cross-graph document image pair distance measure for the second document image dimension of the two document image dimensions based at least in part on the third dimension-wide bounding box pair distance measure graph data object and the fourth dimension-wide bounding box pair distance measure graph data object, and (vii) generate the spatial fingerprint document image pair distance measure based at least in part on the first cross-graph document image pair distance measure and the second cross-graph document image pair distance measure.

In some embodiments, step/operation 402 may be performed in accordance with the process that is depicted in FIG. 6. The process that is depicted in FIG. 6 begins at step/operation 601 when the predictive data analysis computing entity 106 identifies one or more document image bounding boxes for each document image data object in the document image pair.

A document image bounding box may describe a region of an image depicted by a corresponding document data object, such as a region that is deemed to include a similar/structurally-related set of content data. For example, in some embodiments, each portion of an image of a form document that describes the area allocated to a particular question of a form may be associated with a document image bounding box. As another example, in some embodiments, a table in an image of a document may be associated with a document image bounding box. In some embodiments, a document image bounding box may be generated/detected using an optical character recognition (OCR) engine, such as using the Azure Cognitive Service OCR engine. An operational example of various exemplary document image bounding boxes 701-702 of a document image data object 700 is depicted in FIG. 7.

At step/operation 602, the predictive data analysis computing entity 106 determines, for each document image data object in the document image pair and each document image dimension of the plurality of document image dimensions characterizing the document image pair, a dimension-wise bounding box pair distance measure graph data object. For example, as described above, given a document image pair consisting of two document image data objects each having two document image dimensions, the predictive data analysis computing entity 106 may: (i) generate a first dimension-wide bounding box pair distance measure graph data object for a first document image data object in the document image pair with respect to a first document image dimension of the two document image dimensions, (ii) generate a second dimension-wide bounding box pair distance measure graph data object for a second document image data object in the document image pair with respect to the first document image dimension of the two document image dimensions, (iii) generate a third dimension-wide bounding box pair distance measure graph data object for the first document image data object in the document image pair with respect to a second document image dimension of the two document image dimensions, and (iv) generate a fourth dimension-wide bounding box pair distance measure graph data object for the second document image data object in the document image pair with respect to the second document image dimension of the two document image dimensions.

A dimension-wise bounding box pair distance measure graph data object may describe pairwise distance measures across bounding box pairs of the document image bounding boxes of a corresponding document image data object with respect to a corresponding document image dimension. For example, consider a two-dimensional document image data object that is associated with three document image bounding boxes BB1-BB3. In the noted example, the dimension-wise bounding box pair distance measure graph data object for the noted two-dimensional document image data object with respect to a horizontal document image dimension may describe: (i) a dimension-wise bounding box pair distance measure for the bounding box pair comprising the document image bounding box BB1 and the document image bounding box BB2 with respect to the horizontal document image dimension that describes a distance (e.g., a Euclidean distance) between the document image bounding box BB1 and the document image bounding box BB2 with respect to the horizontal document image dimension; (ii) a dimension-wise bounding box pair distance measure for the bounding box pair comprising the document image bounding box BB1 and the document image bounding box BB3 with respect to the horizontal document image dimension that describes a distance (e.g., a Euclidean distance) between the document image bounding box BB1 and the document image bounding box BB3 with respect to the horizontal document image dimension; and (iii) a dimension-wise bounding box pair distance measure for the bounding box pair comprising the document image bounding box BB2 and the document image bounding box BB3 with respect to the horizontal document image dimension that describes a distance (e.g., a Euclidean distance) between the document image bounding box BB2 and the document image bounding box BB3 with respect to the horizontal document image dimension.

Moreover, in the above-noted example, the dimension-wise bounding box pair distance measure graph data object for the noted two-dimensional document image data object with respect to a horizontal document image dimension may describe: (i) a dimension-wise bounding box pair distance measure for the bounding box pair comprising the document image bounding box BB1 and the document image bounding box BB2 with respect to the vertical document image dimension that describes a distance (e.g., a Euclidean distance) between the document image bounding box BB1 and the document image bounding box BB2 with respect to the vertical document image dimension; (ii) a dimension-wise bounding box pair distance measure for the bounding box pair comprising the document image bounding box BB1 and the document image bounding box BB3 with respect to the vertical document image dimension that describes a distance (e.g., a Euclidean distance) between the document image bounding box BB1 and the document image bounding box BB3 with respect to the vertical document image dimension; and (iii) a dimension-wise bounding box pair distance measure for the bounding box pair comprising the document image bounding box BB2 and the document image bounding box BB3 with respect to the vertical document image dimension that describes a distance (e.g., a Euclidean distance) between the document image bounding box BB2 and the document image bounding box BB3 with respect to the vertical document image dimension. In some embodiments, a dimension-wise bounding box pair distance measure graph data object that is associated with a corresponding document image data object and a corresponding document image dimension describe a graph that comprises a set of nodes and a set of edges each associated with a pair of nodes, where: (i) each node of the graph corresponds to a document image bounding box of the corresponding document image data object, and (ii) each edge of the graph that corresponds to a node pair describes the dimension-wise bounding box pair distance measure for the bounding box pair associated with the node pair with respect to the corresponding document image dimension.

In some embodiments, step/operation 602 may be performed in accordance with the process that is depicted in FIG. 8, which is an example process of generating a dimension-wise bounding box pair distance measure graph data object for a first document image data object having a first set of document image bounding boxes and a first document image dimension. The process that is depicted in FIG. 8 begins at step/operation 801 when the predictive data analysis computing entity 106 determines, for each first document image bounding box, a dimension-wise mean coordinate with respect to the first document image dimension.

A dimension-wise mean coordinate may describe a singular-valued measure of location of a corresponding document image bounding box with respect to a corresponding document image coordinate. In some embodiments, the dimension-wise mean coordinate for a corresponding document image bounding box with respect to a corresponding document image coordinate is determined based at least in part on: (i) a right-bottom coordinate for the first document image bounding box with respect to the corresponding document image dimension that describes a coordinate value of a location of the most right-bottom point of the first document image bounding box that corresponds to the document image dimension, and (ii) a left-top coordinate for the first document image bounding box with respect to the corresponding document image dimension that describes a coordinate value of a location of the most left-top point of the first document image bounding box that corresponds to the document image dimension. For example, if the right-bottom coordinate of a two-dimensional document image bounding box is located at $(x_1, y_1)$ and the right-bottom coordinate of the two-dimensional document image bounding box is located at $(x_2, y_2)$, then the dimension-wise mean coordinate for the two-dimensional document image bounding box with respect to a horizontal document image dimension may be determined based at least in part on $x_1$ and $x_2$. As another example, if the right-bottom coordinate of a two-dimensional document image bounding box is located at $(x_1, y_1)$ and the right-bottom coordinate of the two-dimensional document image bounding box is located at $(x_2, y_2)$, then the dimension-wise mean coordinate for the two-dimensional document image bounding box with respect to a vertical document image dimension may be determined based at least in part on $y_1$ and $y_2$. In some embodiments, given a right-bottom coordinate $z_1$ for a first document image bounding box with respect to a selected document image dimension and a left-top coordinate $z_2$ for the first document image bounding box with respect to the selected document image dimension, the dimension-wise mean coordinate for the first document image bounding box with respect to the selected image dimension may be determined based at least in part on the output of the equation $(z_1+z_2)^2$.

At step/operation 802, the predictive data analysis computing entity 106 determines, for each bounding box pair comprising two document image bounding boxes selected from the first set of document image bounding boxes, a dimension-wise bounding box pair distance measure with respect to the first document image dimension based at least in part on the dimension-wise mean coordinate for the first document image bounding box in the bounding box pair with respect to the first document image dimension and the dimension-wise mean coordinate for the second document image bounding box in the bounding box pair with respect to the first document image dimension. In some embodiments, to determine dimension-wise bounding box pair distance measure for a bounding box pair with respect to the first document image dimension, the predictive data analysis computing entity 106 uses a Euclidean distance measure between the dimension-wise mean coordinate for the first document image bounding box in the bounding box pair with respect to the first document image dimension and the dimension-wise mean coordinate for the second document image bounding box in the bounding box pair with respect to the first document image dimension.

In some embodiments, a dimension-wise bounding box pair distance measure describes a measure of distance between the dimension-wise mean coordinate for the first document image bounding box in the bounding box pair with respect to a corresponding document image dimension and the dimension-wise mean coordinate for the second document image bounding box in the bounding box pair with respect to the corresponding document image dimension, such as Euclidean distance measure between the dimension-wise mean coordinate for the first document image bounding box in the bounding box pair with respect to the corresponding document image dimension and the dimension-wise mean coordinate for the second document image bounding box in the bounding box pair with respect to the corresponding document image dimension. In some embodiments, given an n-dimensional bounding box pair that comprises a first n-dimensional document image bounding box having a dimension-wise mean coordinate $c_1$ with respect to a selected document image dimension and a second n-dimensional document image bounding box having a dimension-wise mean coordinate $c_2$ with respect to the selected document image dimension, the dimension-wise bounding box pair distance measures for the n-dimensional bounding box pair with respect to the selected document image dimension is determined based at least in part on the output of $(c_1-c_2)^2$. For example, given a two-dimensional bounding box pair that comprises a first two-dimensional document image bounding box having a dimension-wise mean coordinate $h_1$ with respect to a horizontal document image dimension and a second two-dimensional document image bounding box having a dimension-wise mean coordinate $h_2$ with respect to the horizontal document image dimension, the dimension-wise bounding box pair distance measures for the two-dimensional bounding box pair with respect to the horizontal document image dimension may be determined based at least in part on the output of $(h_1-h_2)^2$. As another example, given a two-dimensional bounding box pair that comprises a first two-dimensional document image bounding box having a dimension-wise mean coordinate $v_1$ with respect to a vertical document image dimension and a second two-dimensional document image bounding box having a dimension-wise mean coordinate $v_2$ with respect to the vertical document image dimension, the dimension-wise bounding box pair distance measures for the two-dimensional bounding box pair with respect to the vertical document image dimension may be determined based at least in part on the output of $(v_1-v_2)^2$.

At step/operation 803, the predictive data analysis computing entity 106 generates the dimension-wise bounding box pair distance measure graph data object for the first document image data object with respect to the first document image dimension based at least in part on each dimension-wise bounding box pair distance measure for a bounding box pair selected from the document image bounding boxes of the first document image data object. As described above, the dimension-wise bounding box pair distance measure graph data object may describe a graph, where: (i) each node of the graph corresponds to a document image bounding box of the corresponding first document image data object, and (ii) each edge of the graph that corresponds to a node pair describes the dimension-wise bounding box pair distance measure for the bounding box pair associated with the node pair with respect to the corresponding first document image dimension.

Returning to FIG. 6, at step/operation 603, the predictive data analysis computing entity 106 determines, for each document image dimension of the set of document image dimensions characterizing the document image pair, a cross-graph document image pair distance measure between the two dimension-wise bounding box pair distance measure graph data objects for the document image dimension, e.g., based at least in part on a measure of deviation between the graphs corresponding to the two noted dimension-wise bounding box pair distance measure graph data objects for the document image dimension.

In some embodiments, a cross-graph document image pair distance measure describes a measure of difference between two dimension-wise bounding box pair distance measure graph data objects for a corresponding document image dimension, where each of the two dimension-wise bounding box pair distance measure graph data objects may correspond to one of the document image data objects of the two document image data objects in a corresponding document image pair. In some embodiments, each document image dimension is (in relation to a particular document image pair) associated with two dimension-wise bounding box pair distance measure graph data objects, one corresponding to the first document image data object in the document image pair and one corresponding to the second document image data object in the document image pair. In some embodiments, the cross-graph document image pair distance measure for the particular document image pair and the particular document image dimension is determined based at least in part on a measure of graph deviation between the two noted dimension-wise bounding box pair distance measure graph data objects. In some embodiments, a measure of graph deviation is determined based at least in part on a graph edit distance measure of the corresponding graphs, and thus determining the cross-graph document image pair distance measure between a first dimension-wise bounding box pair distance measure graph data object and a second dimension-wise bounding box pair distance measure graph data object comprises determining a graph edit document image pair distance measure between the first dimension-wise bounding box pair distance measure graph data object and the second dimension-wise bounding box pair distance measure graph data object. In some embodiments, a graph edit distance measure for two graphs may be calculated in accordance with the at least some of the techniques that are described in Blumental, *New Techniques for Graph Edit Distance Computation* (2019), arXiv: 1908.00265 [cs.DS], available online at https://arxiv.org/ftp/arxiv/papers/1908/1908.00265.pdf.

At step/operation 604, the predictive data analysis computing entity 106 determines the spatial fingerprint document image pair distance measure for the document image pair based at least in part on each cross-graph document image pair distance measure for a document image dimension of the set of document image dimensions characterizing the document image pair. In some embodiments, the predictive data analysis computing entity 106 aggregates (e.g., averages, combines, and/or the like) each cross-graph document image pair distance measure for a document image dimension of the set of document image dimensions characterizing the document image pair to generate the spatial fingerprint document image pair distance measure for the document image pair.

In some embodiments, a spatial fingerprint document image pair distance measure describes a measure of deviation between locational configuration of one or more detected elements of a first document image data object in a corresponding document image pair and locational configuration of one or more detected elements of a second document image data object in the corresponding document image pair. In some embodiments, given an n-dimensional document image pair, the document image pair is associated with n cross-graph document image pair distance measure, where each of the n cross-graph document image pair distance measures is associated with a document image dimension of the n document image dimensions. In some embodiments, the n cross-graph document image pair distance measures are aggregated in a defined manner to generate the spatial fingerprint document image pair distance measure for the document image pair. In some embodiments, the n cross-graph document image pair distance measures are provided as inputs to a trained supervised machine learning model that is configured to generate the spatial fingerprint document image pair distance measure for the document image pair as the output of the trained supervised machine learning model.

In some embodiments, given a document image pair consisting of two document image data objects each having two document image dimensions, a computing entity may: (i) generate a first dimension-wide bounding box pair distance measure graph data object for a first document image data object in the document image pair with respect to a first document image dimension of the two document image dimensions, (ii) generate a second dimension-wide bounding box pair distance measure graph data object for a second document image data object in the document image pair with respect to the first document image dimension of the two document image dimensions, (iii) generate a third dimension-wide bounding box pair distance measure graph data object for the first document image data object in the document image pair with respect to a second document image dimension of the two document image dimensions, (iv) generate a fourth dimension-wide bounding box pair distance measure graph data object for the second document image data object in the document image pair with respect to the second document image dimension of the two document image dimensions, (v) generate a first cross-graph document image pair distance measure for the first document image dimension of the two document image dimensions based at least in part on the first dimension-wide bounding box pair distance measure graph data object and the second dimension-wide bounding box pair distance measure graph data object, (vi) generate a second cross-graph document image pair distance measure for the second document image dimension of the two document image dimensions based at least in part on the third dimension-wide bounding box pair distance measure graph data object and the fourth dimension-wide bounding box pair distance measure graph data object, and (vii) generate the spatial fingerprint document image pair distance measure based at least in part on the first cross-graph document image pair distance measure and the second cross-graph document image pair distance measure. In some embodiments, the spatial fingerprint document image pair distance measure for an n-dimensional document image pair is selected based at least in part on the maximum value of the n cross-graph document image pair distance measures associated with the document image pair.

Returning to FIG. 4, at step/operation 403, the predictive data analysis computing entity 106 determines an object fingerprinting document image pair distance measure for the document image pair. In some embodiments, to generate the object fingerprinting document image pair distance measure for the document image pair, the predictive data analysis computing entity 106 generates, for each document image data object, an object fingerprinting document image crop representation based at least in part on the one or more image crop embeddings for one or more image crops of the document image data object, and then uses each object fingerprinting document image crop representation for a document image data object in the document image pair to determine the object fingerprinting document image pair distance measure for the document image pair.

For example, in some embodiments, given a document image pair that comprises a first document image data object having a first set of three document image bounding boxes and a second document image data object having a second set of four document image bounding boxes, the predictive data analysis computing entity 106 may: (i) process an image crop representation of the first document image bounding box of the first document image data object using an image encoding machine learning model to generate a first image crop embedding for the first document image bounding box of the first document image data object, (ii) process an image crop representation of the second document image bounding box of the first document image data object using the image encoding machine learning model to generate a second image crop embedding for the second document image bounding box of the first document image data object, (iii) process an image crop representation of the third document image bounding box of the first document image data object using the image encoding machine learning model to generate a third image crop embedding for the third document image bounding box of the first document image data object, (iv) process an image crop representation of the first document image bounding box of the second document image data object using the image encoding machine learning model to generate a fourth image crop embedding for the first document image bounding box of the second document image data object, (v) process an image crop representation of the second document image bounding box of the second document image data object using the image encoding machine learning model to generate a fifth image crop embedding for the second document image bounding box of the second document image data object, (vi) process an image crop representation of the third document image bounding box of the second document image data object using the image encoding machine learning model to generate a sixth image crop embedding for the third document image bounding box of the second document image data object, (vii) process an image crop representation of the fourth document image bounding box of the second document image data object using the image encoding machine learning model to generate a seventh image crop embedding for the fourth document image bounding box of the second document image data object, (viii) generate a first object fingerprint document image representation for the first document image data object based at least in part on the first image crop embedding, the second image crop embedding, and the third image crop embedding, (ix) generate a second object fingerprint document image representation for the second document image data object based at least in part on the fourth image crop embedding, the fifth image crop embedding, the sixth image crop embedding, and the seventh image crop embedding, and (x) generate the object fingerprinting document image pair distance measure for the document image pair based at least in part on the first object fingerprint document image representation and the second object fingerprint document image representation.

In some embodiments, step/operation 403 may be performed in accordance with the process that is depicted in FIG. 9, which is an example process for generating an object fingerprinting document image pair distance measure for the document image pair. The process that is depicted in FIG. 9 begins at step/operation 901 when the predictive data analysis computing entity 106 identifies, for each document image data object in the document image pair, one or more image crops. In some embodiments, the image crops of a document image data object may be determined based at least in part on image regions defined using a set of document image bounding boxes for the document image data object, which may or may not be the same as the set of document image bounding boxes used to generate one or more spatial fingerprint document image pair distance measures with respect to the document image data object.

At step/operation 902, the predictive data analysis computing entity 106 determines, for each image crop of a document image data object, an image crop embedding. In some embodiments, the image crop embedding of an image crop may be determined by providing the image crop to a trained image encoder machine learning model and generating the image crop embedding based at least in part on an output of the trained image encoder machine learning model. In some embodiments, the trained image encoder machine learning model comprises a trained convolutional neural network. In some embodiments, the trained image encoder machine learning model is trained using an encoder-decoder architecture (e.g., an autoencoder architecture, a variational autoencoder architecture, and/or the like), where during training the decoder of the encoder-decoder architecture may be configured to process image crop embeddings to regenerate image crops, and a set of optimization operations performed with respect to a measure of deviation between regenerated image crops and ground-truth image crops may be used to set parameters of the image encoder machine learning model.

At step/operation 903, the predictive data analysis computing entity 106 determines, for each document image data object, an object fingerprint document image representation based at least in part on each image crop embedding that is associated with an image crop of the document image data object. For example, in some embodiments, each image crop embedding that is associated with an image crop of a document image data object is a vector, and the noted vectors are combined in a matrix that is then used to generate the object fingerprint document image representation.

In some embodiments, an object fingerprint document image representation describes a representation of a corresponding document image data object that is determined based at least in part on each image crop embedding that is associated with an image crop of the document image data object. For example, in some embodiments, given a document image pair that comprises a first document image data object having a first set of three document image bounding boxes and a second document image data object having a second set of four document image bounding boxes, a computing entity may: (i) process an image crop representation of the first document image bounding box of the first document image data object using an image encoding machine learning model to generate a first image crop embedding for the first document image bounding box of the first document image data object, (ii) process an image crop representation of the second document image bounding box of the first document image data object using the image encoding machine learning model to generate a second image crop embedding for the second document image bounding box of the first document image data object, (iii) process an image crop representation of the third document image bounding box of the first document image data object using the image encoding machine learning model to generate a third image crop embedding for the third document image bounding box of the first document image data object, (iv) process an image crop representation of the first document image bounding box of the second document image data object using the image encoding machine learning model to generate a fourth image crop embedding for the first document image bounding box of the second document image data object, (v) process an image crop representation of the second document image bounding box of the second document image data object using the image encoding machine learning model to generate a fifth image crop embedding for the second document image bounding box of the second document image data object, (vi) process an image crop representation of the third document image bounding box of the second document image data object using the image encoding machine learning model to generate a sixth image crop embedding for the third document image bounding box of the second document image data object, (vii) process an image crop representation of the fourth document image bounding box of the second document image data object using the image encoding machine learning model to generate a seventh image crop embedding for the fourth document image bounding box of the second document image data object, (viii) generate a first object fingerprint document image representation for the first document image data object based at least in part on the first image crop embedding, the second image crop embedding, and the third image crop embedding, and (ix) generate a second object fingerprint document image representation for the second document image data object based at least in part on the fourth image crop embedding, the fifth image crop embedding, the sixth image crop embedding, and the seventh image crop embedding.

In some embodiments, an object fingerprint document image representation describes an m×n matrix, where m corresponds to the number of image crops of the associated document image data object, n corresponds to the size of the image crop embeddings generated by an image encoder machine learning model, and each row of the m×n describes an image crop embedding for an image crop of the associated document image data object.

At step/operation 904, the predictive data analysis computing entity 106 determines the object fingerprint document image pair distance measure for the document image pair based at least in part on each object fingerprint document image representation for a document image data object. In some embodiments, the predictive data analysis computing entity 106 determines the object fingerprint document image pair distance measure for the document image pair based at least in part on a measure of deviation of each object fingerprint document image representation for a document image data object.

In some embodiments, an object fingerprint document image pair distance measure describes a measure of difference between two document image data objects in a corresponding document image pair that is determined based at least in part on each object fingerprint document image representation for a document image data object in the corresponding document image pair. In some embodiments, a document image pair is associated with two object fingerprint document image representations each associated with a document image data object in the document image pair. In some embodiments, the object fingerprint document image pair distance measure for a document image pair is determined based at least in part on a measure of difference between the two object fingerprint document image representations associated with the document image pair, such as an L2 distance measures between matrices described by the two object fingerprint document image representations associated with the document image pair (where each matrix corresponds to a document image data object in the document image pair). In some embodiments, determining the object fingerprint document image pair distance measure based at least in part on a first object fingerprint document image representation and a second object fingerprint document image representation comprises performing a transposition operation on the second object fingerprint document image representation to generate a transposed object fingerprint document image representation; and determining the object fingerprint document image pair distance measure based at least in part on an L2 document image pair distance measure between first object fingerprint document image representation and the transposed object fingerprint document image representation.

Returning to FIG. 4, at step/operation 404, the predictive data analysis computing entity 106 determines a semantic fingerprinting document image pair distance measure for the document image pair. In some embodiments, to generate the semantic fingerprinting document image pair distance measure for a document image pair comprising two document image data objects, the predictive data analysis computing entity 106 generates a semantic fingerprint document image representation of each document image data object in the document image pair and determines a semantic fingerprint document image pair distance measure for the document image pair based at least in part on each semantic fingerprint document image representation for a document image data object.

In some embodiments, step/operation 404 may be performed in accordance with the process that is depicted in FIG. 10, which is an example process for determining a semantic fingerprint document image pair distance measure for a document image pair. The process that is depicted in FIG. 10 begins at step/operation 1001 when the predictive data analysis computing entity 106 determines, for each document image data object in the document image pair, a textual representation of (e.g., a set of words that are detected to occur in) of the document image data object. In some embodiments, the predictive data analysis computing entity 106 determines the textual representation of a document image data object based at least in part on the output of processing an image corresponding to the document image data object using one or more OCR engines.

At step/operation 1002, the predictive data analysis computing entity 106 generates, for each document image data object in the document image pair, a semantic fingerprint document image representation based at least in part on the textual representation of the document image data object. In some embodiments, determining the semantic fingerprint document image representation for a first document image data object comprises generating, based at least in part on the textual representation for the first document image data object and using a document encoding machine learning model (e.g., a Doc2Vec machine learning model, a Paragrap2Vec machine learning model, an attention-based text encoding machine learning model, and/or the like), the semantic fingerprint document image representation for the first document image data object. Thus, in some embodiments, a semantic fingerprint document image representation of a document image data object is the Doc2Vec representation of textual data associated with the document image data object.

At step/operation 1003, the predictive data analysis computing entity 106 determines a semantic fingerprint document image pair distance measure for the document image pair based at least in part on each semantic fingerprint document image representation for a document image data object. In some embodiments, the semantic fingerprint document image pair distance measure for the document image pair describes a measure of deviation between the two semantic fingerprint document image representations for the document image pair (e.g., a Euclidean measure of deviation between the two semantic fingerprint document image representations for the document image pair).

Returning to FIG. 4, at step/operation 405, the predictive data analysis computing entity 106 generates the predicted document image pair distance measure for the document image pair based at least in part on at least one of the spatial fingerprint document image pair distance measure for the document image pair, the object fingerprint document image pair distance measure for the document image pair, and the semantic fingerprint document image pair distance measure for the document image pair. In some embodiments, the predictive data analysis computing entity 106 generates the predicted document image pair distance measure for the document image pair by combining the spatial fingerprint document image pair distance measure for the document image pair, the object fingerprint document image pair distance measure for the document image pair, and the semantic fingerprint document image pair distance measure for the document image pair in a defined manner.

In some embodiments, a predicted document image pair distance measure describes a predicted measure of deviation between two document image data objects associated with a document image pair, where the predicted measure of deviation may integrate both deviations or similarities between structures of the two document image data objects as well as contents of the two document image data objects. In some embodiments, a computing entity generates the predicted document image pair distance measure for a document image pair by combining the spatial fingerprint document image pair distance measure for the document image pair, the object fingerprint document image pair distance measure for the document image pair, and the semantic fingerprint document. In some embodiments, a computing entity generates the predicted document image pair distance measure for a document image pair by providing the spatial fingerprint document image pair distance measure for the document image pair, the object fingerprint document image pair distance measure for the document image pair, and the semantic fingerprint document for the document image pair to a trained supervised machine learning model that is configured to generate the predicted document image pair distance measure based at least in part on processing the spatial fingerprint document image pair distance measure for the document image pair, the object fingerprint document image pair distance measure for the document image pair, and the semantic fingerprint document for the mentioned document image pair.

In some embodiments, given a spatial fingerprint document image pair distance measure S, an object fingerprint document image pair distance measure O, and a semantic fingerprint document image pair distance measure T, the predicted document image pair distance measure P for a corresponding document image pair may be calculated based at least in part on the equation P=S+O+T In some embodiments, given a spatial fingerprint document image pair distance measure S, an object fingerprint document image pair distance measure O, and a set of cross-graph document image pair distance measures $\{d_1, \ldots, d_n\}$ for n document image dimensions of a corresponding document image pair, then the predicted document image pair distance measure P for the corresponding document image pair may be calculated based at least in part on the equation P=S+O+max$\{d_1, \ldots, d_n\}$. For example, given a spatial fingerprint document image pair distance measure S, an object fingerprint document image pair distance measure O, and a set of cross-graph document image pair distance measures $\{d_{vertical}, h_{horizontal}\}$ for two document image dimensions of a corresponding document image pair, then the predicted document image pair distance measure P for the corresponding document image pair may be calculated based at least in part on the equation P=S+O+max($d_{vertical}$, $h_{horizontal}$).

At step/operation 405, the predictive data analysis computing entity 106 performs one or more prediction-based actions based at least in part on the predicted document image pair distance measure. In some embodiments, performing one or more prediction-based actions comprises determining a plurality of document image clusters of the plurality of document image data objects based at least in part on each predicted document image pair distance measure for a document image pair in the plurality of document image pairs, and then routing task items corresponding to each document image cluster to a document processing agent/engine associated with the document image cluster. It is understandable that the distance metrics computed herein can be used in any clustering algorithm, e.g., K-Means (e.g., in case of shape-based clusters) or Hierarchical Density-Based Spatial Clustering of Applications (HDBSCAN) (e.g., in case of spatial clusters), to find the distinct categories of document image data objects that are present in a corpus as the distance metric is deemed to provide a definite and deterministic distance between any two document image data objects. In some embodiments, the categorization is performed in a manner that is configured to ensure that the computed distances should be relatively small for any two images in a category of templates (e.g., intra-cluster distance measures should be relatively small) and the computed distances should be noticeably high for any two images picked from any two category of templates (e.g., inter-cluster distance measure should be noticeably high).

In some embodiments, performing the prediction-based actions comprises displaying document image cluster depiction user interfaces each depicting at least some of the document images in a corresponding document image cluster. Operational examples of three document image cluster depiction user interfaces 1100, 1200, and 1300 are depicted in FIGS. 11-13. As depicted in FIG. 11, the document image cluster depiction user interface 1100 depicts two images 1101-1102 that are deemed representative of a corresponding document image cluster. As further depicted in FIG. 12, the document image cluster depiction user interface 1200 depicts two images 1201-1202 that are deemed representative of a corresponding document image cluster. As further depicted in FIG. 13, the document image cluster depiction user interface 1300 depicts two images 1301-1302 that are deemed representative of a corresponding document image cluster.

Accordingly, various embodiments of the present invention introduce techniques for digital document analysis that utilize a combination of supervised machine learning techniques and unsupervised machine learning techniques to efficiently and reliably infer similarities across document image data objects. For example, various embodiments of the present invention utilize systems, methods, and computer program products that perform digital document analysis using at least one of spatial fingerprint document image pair distance measures for document image pairs, object fingerprint document image pair distance measures for document image pairs, and semantic fingerprint document image pair distance measures for document image pairs. By using the noted techniques, various embodiments of the present invention enable identifying similar document image data objects, which in turn enables using similarity inferences in responding to search queries related to document image data objects. Accordingly, various embodiments of the present invention improve the computational efficiency and operational reliability of processing search queries related to document image data objects related to document image data objects, and make important contributions to improving document image server systems.

An exemplary application of various embodiments of the present invention relates to segmentation of document images based at least in part on template structures of those document images. Given a corpus of document images (e.g., scanned images of medical forms), proposed techniques extract features related to texts provided in the document images, tables provided in the document images, and spatial alignment of the texts provided in the document images and the tables provided in the document images. The extracted features are then used in accordance with a distance equation in order to generate a template similarity measure for two document images. The distance equation is in some embodiments as follows: combined_distance(D1, D2) $p_1$*vector_distance(D1, D2)+$p_2$*statistical_distance(D1, D2)+$p_3$*matrix_distance(D1, D2), where combined_distance(D1, D2) is the template similarity measure for a first document image D1 and a second document image D2, vector_distance(D1, D2) is the similarity measure for a vector representation of the text of D1 and a vector representation of text of D2, $p_1$ is a trained weight for vector_distance(D1, D2), statistical_distance(D1, D2) is a similarity measure for a sequential representation of vector representations of words of D1 and a sequential representation of vector representations of words of D2, $p_2$ is a trained weight for statistical_distance(D1, D2), matrix_distance(D1, D2) is the similarity measure for a matrix representation of the template of D1 and the matrix representation of the template of D2, and $p_3$ is a trained weight for matrix_distance(D1, D2).

In some embodiments, vector_distance(D1, D2) is calculated using the below operations: extracting the texts of D1 and D2 using object code recognition (OCR) techniques; processing each text using a Doc2Vec (or other natural language processing) model to generate a vector representation of the corresponding document image; and generating an L2 distance of the two vector representations. In some embodiments, matrix_distance(D1, D2) is calculated using the below operations: generating a bounding box image representation of each of D1 and D2; processing the bounding box image representations using an autoencoder machine learning model to generate an encoded matrix representation for each document image; and generating an L2 distance of the two encoded matrix representations. In some embodiments, statistical_distance(D1, D2) is calculated using the below operations: extracting a word sequence for each of D1 and D2 using an OCR technique; for each word in a word sequence, generating a vector representation given coordinates and lags of the word so that each document image is associated with a vector representation sequence; and generating a dynamic time wrapping distance of the two vector representation sequences.

VI. CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method for determining a predicted document image pair distance measure for a document image pair, the computer-implemented method comprising:
    identifying, by one or more processors, one or more document image bounding boxes for each document image data object in the document image pair;
    identifying, by the one or more processors, a plurality of document image dimensions associated with the document image pair;
    for each document image dimension, by the one or more processors:
        determining a dimension-wise bounding box pair distance measure graph data object for each document image data object in the document image pair, wherein the dimension-wise bounding box pair distance measure graph data object for a document image data object describes, for each bounding box pair selected from the one or more document image bounding boxes of the document image data object, a dimension-wise bounding box pair distance measure for the bounding box pair with respect to the document image dimension, and
        determining a cross-graph document image pair distance measure between each dimension-wise bounding box pair distance measure graph data object for the document image dimension;
    determining, by the one or more processors, a spatial fingerprint document image pair distance measure for the document image pair based at least in part on each cross-graph document image pair distance measure for a document image dimension;
    determining, by the one or more processors, the predicted document image pair distance measure based at least in part on the spatial fingerprint document image pair distance measure; and
    initiating, by the one or more processors, the performance of one or more prediction-based actions based at least in part on the predicted document image pair distance measure.

2. The computer-implemented method of claim 1, wherein determining the cross-graph document image pair distance measure between a first dimension-wise bounding box pair distance measure graph data object and a second dimension-wise bounding box pair distance measure graph data object comprises:
    determining a graph edit document image pair distance measure between the first dimension-wise bounding box pair distance measure graph data object and the second dimension-wise bounding box pair distance measure graph data object.

3. The computer-implemented method of claim 1, wherein determining the dimension-wise bounding box pair distance measure between a first document image bounding box and a second document image bounding box with respect to a first document image dimension comprises:
    determining a first dimension-wise mean coordinate for the first document image bounding box with respect to the first document image dimension;

determining a second dimension-wise mean coordinate for the second document image bounding box with respect to the first document image dimension; and determining the dimension-wise bounding box pair distance measure based at least in part on a distance measure between the first dimension-wise mean coordinate and the second dimension-wise mean coordinate.

4. The computer-implemented method of claim 3, wherein determining the first dimension-wise mean coordinate comprises:

determining a right-bottom coordinate for the first document image bounding box;

determining a left-top coordinate for the first document image bounding box; and determining the first dimension-wise mean coordinate based at least in part on the right-bottom coordinate and the left-top coordinate.

5. The computer-implemented method of claim 1, wherein determining the predicted document image pair distance measure further comprises:

for each document image data object in the document image pair:

determining one or more image crops corresponding to the one or more document image bounding boxes of the document image data object;

generating one or more image crop embeddings based at least in part on the one or more image crops; and generating an object fingerprint document image representation for the document image data object based at least in part on the one or more image crop embeddings;

determining an object fingerprint document image pair distance measure for the document image pair based at least in part on each object fingerprint document image representation for a document image data object; and determining the predicted document image pair distance measure based at least in part on the object fingerprint document image pair distance measure.

6. The computer-implemented method of claim 5, wherein determining the object fingerprint document image pair distance measure based at least in part on a first object fingerprint document image representation and a second object fingerprint document image representation comprises:

performing a transposition operation on the second object fingerprint document image representation to generate a transposed object fingerprint document image representation; and determining the object fingerprint document image pair distance measure based at least in part on an L2 document image pair distance measure between first object fingerprint document image representation and the transposed object fingerprint document image representation.

7. The computer-implemented method of claim 1, wherein determining the predicted document image pair distance measure further comprises:

for each document image data object in the document image pair:

identifying a textual representation of the document image data object; and generating a semantic fingerprint document image representation of the document image data object based at least in part on the textual representation;

determining a semantic fingerprint document image pair distance measure for the document image pair based at least in part on each semantic fingerprint document image representation for a document image data object; and determining the predicted document image pair distance measure based at least in part on the semantic fingerprint document image pair distance measure.

8. The computer-implemented method of claim 7, wherein determining the semantic fingerprint document image representation for a first document image data object comprises:

generating, based at least in part on the textual representation for the first document image data object and using a document encoding machine learning model, the semantic fingerprint document image representation.

9. The computer-implemented method of claim 1, wherein performing the one or more prediction-based actions comprises:

identifying a plurality of document image pairs that comprises the document image pair, wherein the plurality of document image pairs is associated with a plurality of document image data objects; and determining a plurality of document image clusters of the plurality of document image data objects based at least in part on each predicted document image pair distance measure for a document image pair in the plurality of document image pairs.

10. The computer-implemented method of claim 1, wherein the one or more document image bounding boxes for each document image data object in the document image pair are generated by an optical character recognition engine based at least in part on the document image data object.

11. An apparatus for determining a predicted document image pair distance measure for a document image pair, the apparatus comprising one or more processors and at least one memory including program code, the at least one memory and the program code configured to, with the one or more processors, cause the apparatus to at least:

identify one or more document image bounding boxes for each document image data object in the document image pair;

identify a plurality of document image dimensions associated with the document image pair;

for each document image dimension:

determine a dimension-wise bounding box pair distance measure graph data object for each document image data object in the document image pair, wherein the dimension-wise bounding box pair distance measure graph data object for a document image data object describes, for each bounding box pair selected from the one or more document image bounding boxes of the document image data object, a dimension-wise bounding box pair distance measure for the bounding box pair with respect to the document image dimension, and determine a cross-graph document image pair distance measure between each dimension-wise bounding box pair distance measure graph data object for the document image dimension;

determine a spatial fingerprint document image pair distance measure for the document image pair based at least in part on each cross-graph document image pair distance measure for a document image dimension;

determine the predicted document image pair distance measure based at least in part on the spatial fingerprint document image pair distance measure; and initiate the performance one or more prediction-based actions based at least in part on the predicted document image pair distance measure.

12. The apparatus of claim 11, wherein determining the cross-graph document image pair distance measure between a first dimension-wise bounding box pair distance measure graph data object and a second dimension-wise bounding box pair distance measure graph data object comprises:
determining a graph edit document image pair distance measure between the first dimension-wise bounding box pair distance measure graph data object and the second dimension-wise bounding box pair distance measure graph data object.

13. The apparatus of claim 11, wherein determining the dimension-wise bounding box pair distance measure between a first document image bounding box and a second document image bounding box with respect to a first document image dimension comprises:
determining a first dimension-wise mean coordinate for the first document image bounding box with respect to the first document image dimension;
determining a second dimension-wise mean coordinate for the second document image bounding box with respect to the first document image dimension; and
determining the dimension-wise bounding box pair distance measure based at least in part on a distance measure between the first dimension-wise mean coordinate and the second dimension-wise mean coordinate.

14. The apparatus of claim 13, wherein determining the first dimension-wise mean coordinate comprises:
determining a right-bottom coordinate for the first document image bounding box;
determining a left-top coordinate for the first document image bounding box; and
determining the first dimension-wise mean coordinate based at least in part on the right-bottom coordinate and the left-top coordinate.

15. The apparatus of claim 11, wherein determining the predicted document image pair distance measure further comprises:
for each document image data object in the document image pair:
determining one or more image crops corresponding to the one or more document image bounding boxes of the document image data object;
generating one or more image crop embeddings based at least in part on the one or more image crops; and
generating an object fingerprint document image representation for the document image data object based at least in part on the one or more image crop embeddings;
determining an object fingerprint document image pair distance measure for the document image pair based at least in part on each object fingerprint document image representation for a document image data object; and
determining the predicted document image pair distance measure based at least in part on the object fingerprint document image pair distance measure.

16. The apparatus of claim 15, wherein determining the object fingerprint document image pair distance measure based at least in part on a first object fingerprint document image representation and a second object fingerprint document image representation comprises:
performing a transposition operation on the second object fingerprint document image representation to generate a transposed object fingerprint document image representation; and
determining the object fingerprint document image pair distance measure based at least in part on an L2 document image pair distance measure between first object fingerprint document image representation and the transposed object fingerprint document image representation.

17. The apparatus of claim 11, wherein determining the predicted document image pair distance measure further comprises:
for each document image data object in the document image pair:
identifying a textual representation of the document image data object; and
generating a semantic fingerprint document image representation of the document image data object based at least in part on the textual representation;
determining a semantic fingerprint document image pair distance measure for the document image pair based at least in part on each semantic fingerprint document image representation for a document image data object; and
determining the predicted document image pair distance measure based at least in part on the semantic fingerprint document image pair distance measure.

18. The apparatus of claim 17, wherein determining the semantic fingerprint document image representation for a first document image data object comprises:
generating, based at least in part on the textual representation for the first document image data object and using a document encoding machine learning model, the semantic fingerprint document image representation.

19. The apparatus of claim 11, wherein performing the one or more prediction-based actions comprises:
identifying a plurality of document image pairs that comprises the document image pair, wherein the plurality of document image pairs is associated with a plurality of document image data objects; and
determining a plurality of document image clusters of the plurality of document image data objects based at least in part on each predicted document image pair distance measure for a document image pair in the plurality of document image pairs.

20. A computer program product for determining a predicted document image pair distance measure for a document image pair, the computer program product comprising at least one non-transitory computer-readable storage medium having computer-readable program code portions stored therein, the computer-readable program code portions configured to:
identify one or more document image bounding boxes for each document image data object in the document image pair;
identify a plurality of document image dimensions associated with the document image pair;
for each document image dimension:
determine a dimension-wise bounding box pair distance measure graph data object for each document image data object in the document image pair, wherein the dimension-wise bounding box pair distance measure graph data object for a document image data object describes, for each bounding box pair selected from the one or more document image bounding boxes of the document image data object, a dimension-wise bounding box pair distance measure for the bounding box pair with respect to the document image dimension, and determine a cross-graph document image pair distance measure between each dimension-wise bounding box pair distance measure graph data object for the document image dimension;

determine a spatial fingerprint document image pair distance measure for the document image pair based at least in part on each cross-graph document image pair distance measure for a document image dimension;

determine the predicted document image pair distance measure based at least in part on the spatial fingerprint document image pair distance measure; and initiate the performance one or more prediction-based actions based at least in part on the predicted document image pair distance measure.

\* \* \* \* \*